US008280225B2

(12) United States Patent
Kamada et al.

(10) Patent No.: US 8,280,225 B2
(45) Date of Patent: Oct. 2, 2012

(54) INFORMATION PROCESSING DEVICE, DISPLAY DATA PROVIDING METHOD, AND PROGRAM

(75) Inventors: Yasunori Kamada, Kanagawa (JP); Yoichiro Sako, Tokyo (JP); Kazunori Hayashi, Tokyo (JP); Takayasu Kon, Tokyo (JP); Takashi Fukushima, Tokyo (JP); Masamichi Asukai, Kanagawa (JP); Akane Sano, Tokyo (JP); Taiji Ito, Kanagawa (JP); Akinobu Sugino, Kanagawa (JP); Yoshiteru Kamatani, Kanagawa (JP); Mitsuru Takehara, Tokyo (JP)

(73) Assignee: Sony Corporation, Tokyo (JP)

( * ) Notice: Subject to any disclaimer, the term of this patent is extended or adjusted under 35 U.S.C. 154(b) by 686 days.

(21) Appl. No.: 12/351,962

(22) Filed: Jan. 12, 2009

(65) Prior Publication Data

US 2009/0187597 A1 Jul. 23, 2009

(30) Foreign Application Priority Data

Jan. 21, 2008 (JP) ................................. 2008-010955

(51) Int. Cl.
*H04N 9/80* (2006.01)
(52) U.S. Cl. ...................................................... 386/248
(58) Field of Classification Search .................. 386/248; 705/14.51, 14.52, 14.53
See application file for complete search history.

(56) References Cited

U.S. PATENT DOCUMENTS

| 5,585,220 A | 12/1996 | Breyta et al. |
| 5,909,023 A * | 6/1999 | Ono et al. ..................... 235/380 |
| 2004/0128196 A1 * | 7/2004 | Shibuno .......................... 705/14 |
| 2006/0016877 A1 | 1/2006 | Bonalle et al. |
| 2006/0089543 A1 * | 4/2006 | Kim et al. ..................... 600/300 |
| 2009/0152344 A1 | 6/2009 | Kamada et al. |
| 2009/0157298 A1 | 6/2009 | Kon et al. |
| 2009/0199105 A1 | 8/2009 | Kamada et al. |
| 2010/0280902 A1 * | 11/2010 | Pang .......................... 705/14.54 |

FOREIGN PATENT DOCUMENTS

| GB | 2301207 A | 11/1996 |
| GB | 2333838 A | 8/1999 |
| JP | 54-156600 A | 12/1979 |
| JP | 58-027509 A | 2/1983 |
| JP | 07-036657 A | 2/1995 |
| JP | 09-091352 A | 4/1997 |
| JP | 09-251502 A | 9/1997 |
| JP | 11-076620 A | 3/1999 |
| JP | 2000-242717 A | 9/2000 |
| JP | 2000-306162 A | 11/2000 |

(Continued)

*Primary Examiner* — Thai Tran
*Assistant Examiner* — William Tran
(74) *Attorney, Agent, or Firm* — Wolf, Greenfield & Sacks, P.C.

(57) ABSTRACT

There is provided an information processing device capable of communicating with a purchase history storage device for storing purchase history data and a display device, the information processing device including a storage unit for storing user image data and property data; a communication unit; a purchase history data acquiring unit for acquiring the purchase history data; a property data recording unit for generating and recording the property data based on the purchase history data; a property data updating unit for updating the property data to property data including a second property image represented with a time interval from when the user purchased the property until present based on the property data and time information; and a display data generating unit for generating display data shown with the user image and an image of the property according to the display request.

15 Claims, 15 Drawing Sheets

FOREIGN PATENT DOCUMENTS

| | | |
|---|---|---|
| JP | 3127443 B2 | 11/2000 |
| JP | 2001-147132 A | 5/2001 |
| JP | 2001-174273 A | 6/2001 |
| JP | 2001-252481 A | 9/2001 |
| JP | 2002-098537 A | 4/2002 |
| JP | 2002-278993 A | 9/2002 |
| JP | 2002-350153 A | 12/2002 |
| JP | 2002-366862 A | 12/2002 |
| JP | 2003-030449 A | 1/2003 |
| JP | 2003-288515 A | 10/2003 |
| JP | 2003-302240 A | 10/2003 |
| JP | 2003-308434 A | 10/2003 |
| JP | 2004-005502 A | 1/2004 |
| JP | 2004-077335 A | 3/2004 |
| JP | 2004-102381 A | 4/2004 |
| JP | 2004-193995 A | 7/2004 |
| JP | 2005-144191 A | 6/2005 |
| JP | 2006-110340 | 4/2006 |
| JP | 2006-170814 A | 6/2006 |
| JP | 2006-301955 A | 11/2006 |
| JP | 2007-233491 A | 9/2007 |
| JP | 2007-257168 A | 10/2007 |
| JP | 2007-269268 A | 10/2007 |
| JP | 2007-316857 A | 12/2007 |
| KR | 20010044437 A | 6/2001 |
| WO | WO 2005/010267 A | 2/2006 |

* cited by examiner

FIG.10

| USER ID | USER NAME | IMAGE DATA |
|---------|-----------|------------|
| user A  | ○ × △     | u01.jpg    |
| user B  | □ ☆ □     | u02.jpg    |
| ⋮       | ⋮         | ⋮          |

FIG.11

| USER ID | PROPERTY | PURCHASED DATE | OBTAINING METHOD | IMAGE DATA | IMAGE DATA REGISTERED DATE AND TIME | GROUP A DISPLAY DECISION | GROUP A DISPLAY METHOD | GROUP B DISPLAY DECISION | GROUP B DISPLAY METHOD |
|---|---|---|---|---|---|---|---|---|---|
| user A | ARTICLE Y | 2000.6.12 | - | y01.jpg | 2000.6.13 | DISPLAY | DETAILED LAYER | NON-DISPLAY | - |
| user A | ARTICLE Y | 2000.6.12 | - | y02.jpg | 2000.6.13 | DISPLAY | DETAILED LAYER | DISPLAY | SCHEMATIC LAYER |
| user A | ARTICLE T | 2000.10.1 | LOAN | t01.jpg | 2000.10.1 | DISPLAY | DETAILED LAYER | NON-DISPLAY | - |
| user A | ARTICLE T | 2000.10.1 | LOAN | t02.jpg | 2001.10.1 | DISPLAY | DETAILED LAYER | NON-DISPLAY | - |
| user A | ARTICLE T | 2000.10.1 | LOAN | t03.jpg | 2002.10.1 | DISPLAY | DETAILED LAYER | DISPLAY | DETAILED LAYER |
| ... | ... | ... | ... | ... | ... | ... | ... | ... | ... |
| user A | ARTICLE K | 2007.12.15 | *** ELECTRIC APPLIANCE STORE | k01.jpg | 2007.12.15 | DISPLAY | DETAILED LAYER | DISPLAY | DETAILED LAYER |
| user A | ARTICLE K | 2007.12.16 | SECONDHAND | a01.jpg | 2007.12.17 | DISPLAY | SCHEMATIC LAYER | DISPLAY | SCHEMATIC LAYER |

FIG.12

| ARTICLE ID | ARTICLE NAME | IMAGE DATA |
|---|---|---|
| 12345X78 | ARTICLE A | a01.jpg |
| 1234X678 | ARTICLE B | b02.jpg |
| 123X5678 | ARTICLE C | c02.jpg |
| ⋮ | ⋮ | ⋮ |

INFORMATION PROCESSING DEVICE, DISPLAY DATA PROVIDING METHOD, AND PROGRAM

CROSS REFERENCES TO RELATED APPLICATIONS

The present invention contains subject matter related to Japanese Patent Application JP 2008-010955 filed in the Japan Patent Office on Jan. 21, 2008, the entire contents of which being incorporated herein by reference.

BACKGROUND OF THE INVENTION

1. Field of the Invention

The present invention relates to an information processing device, a display data providing method, and a program.

2. Description of the Related Art

In recent years, text data, image data, and the like provided by a certain user can be shared by an unspecified majority through homepage, blog (Weblog) and the like.

The information on the user (e.g., information indicating state of user) can be transmitted to unspecified number of people by presenting images and the like on the homepage and the blog, but then again, the privacy of the user may be infringed.

A technique of representing the state of the user by image is thus developed. A technique of generating an image showing the health condition of the user based on parameter information showing the health condition of the user is disclosed in Japanese Patent Application Laid-Open No. 2006-110340 and the like.

SUMMARY OF THE INVENTION

A system of recording behavior history of the user called life log has appeared in recent years. A usage mode of sharing the information on the property of the user with unspecified number of browsers on the network based on the purchase history (purchase behavior) of the user, for example, of the information on the recorded behavior history of the user is presumed in the years to come. The information such as life level and preference, fashion sense and the like of the user can be shared among unspecified number of people by presenting the information on the property based on the purchase behavior of a certain user on the network. If the information on the property based on the purchase behavior of a certain user is shared among unspecified number of people, a connection is created, which has a possibility of growing to a community of a size of a certain extent, between the user and another person owning the same type of article, between the user and another person who intends to purchase the property of the user, and the like.

The related art of representing the state of the user by image does not directly represent (e.g., numerical value etc.) the state of the user, but represents the state of the user through an indirect means such as image, and thus the state of the user may be represented while maintaining the privacy of the user. However, in the related art of representing the state of the user by images, the image is simply generated based on the input parameter information indicating the health state. That is, the related art of representing the state of the user by images can only represent the state of the user at the time the parameter information is generated (or state predicted from the generated time). Furthermore, the related art of representing the state of the user by images does not suggest representing time-lapse information as the state of the user. Therefore, even if the related art of representing the state of the user by images is used in sharing the information on the property based on the purchase behavior of the user, the property purchased a few years ago and the property purchased a few days ago may be difficult to be represented in a distinguished manner in the related art of representing the state of the user by images. Therefore, even if the related art of representing the state of the user by images is used, whether the user presenting the information on the property based on the purchase behavior has owned the relevant property for a long time or not much time has elapsed from purchase may be difficult to be represented (i.e., amount of information is small), and thus the possibility the connection with another person developing to a community is significantly low.

Therefore, the state of the user may be difficult to be sufficiently represented while maintaining the privacy of the user even if the related art of representing the state of the user by images is used to share the information on the property based on the purchase behavior of the user with unspecified number of people.

The present invention is provided in view of the above-described issues, and it is desirable to provide a new and improved information processing device, a display data providing method, and a program enabling the information on the property based on the purchase behavior of the user to be shared among unspecified number of people while maintaining the privacy of the user.

According to an embodiment of the present invention, there is provided an information processing device capable of communicating with a purchase history storage device for storing, for every user, purchase history data including article identification information for identifying an article and purchased time information indicating a time the article is purchased, and a display device for displaying an image; an information processing device including a storage unit for storing user image data in which user identification information for identifying a user and a user image showing each user are recorded in correspondence to each other, and property data in which a first property image showing a property owned by the user through purchase and the purchased time information are recorded in correspondence to each other; a communication unit for communicating with the purchase history storage device and/or the display device; a purchase history data acquiring unit for acquiring the purchase history data from the purchase history storage device; a property data recording unit for generating the property data based on the purchase history data acquired by the purchase history data acquiring unit, and recording the generated property data in the storage unit; a property data updating unit for updating the property data stored in the storage unit to property data including a second property image represented with a time interval from when the user purchased the property until present based on the purchased time information of the property data stored in the storage unit and time information defining a current time; and a display data generating unit for generating display data shown with the user image showing a user which display is requested by a display request and an image of the property owned by the user according to the display request transmitted from the display device.

According to such configuration, the information on the property based on the purchase behavior of the user can be shared among unspecified number of people while maintaining the privacy of the user.

The property data updating unit may calculate an elapsed time from the purchase based on the purchased time information of the property data stored in the storage unit and the time information, and generate the second property image corresponding to the calculated elapsed time.

According to such configuration, the time-lapse information related to each property owned by the user can be represented by image.

The storage unit may further store article data in which the article identification information for identifying an article and the article image showing the article are corresponded; and the property data recording unit may select the corresponding article image from the article data based on the article identification information of the purchase history data, and generate the property data with the selected article image as the first property image.

According to such configuration, the information on the property based on the purchase behavior of the user can be shared among unspecified number of people while maintaining the privacy of the user.

The purchase history data acquiring unit may acquire the purchase history data further including purchase source information indicating a purchase source from which the user purchased the article and/or information on a payment method of the user; and the property data recording unit may generate the first property image based on the purchase source information and/or the information on the payment method of the purchase history data.

According to such configuration, the information on the property based on the purchase behavior of the user can be shared among unspecified number of people while maintaining the privacy of the user.

The display data generating unit may include a display target determining unit for specifying a user for generating the display data based on the display request, and a data generating unit for generating the display data based on the user specified by the display target determining unit, the user image data, and the property data.

According to such configuration, the information on the property based on the purchase behavior of the user can be shared among unspecified number of people while maintaining the privacy of the user.

The data generating unit may generate the display data having the second property image as the image of the property when the second property corresponding to one property is present in the property data.

According to such configuration, the information on the property based on the purchase behavior of the user in which the time-lapse information related to each property owned by the user is represented by image can be shared among unspecified number of people while maintaining the privacy of the user.

The storage unit may store the property data further including first group information in which display/non-display for every property is defined for every group; the display target determining unit may further determine a group based on the display request; and the data generating unit may generate the display data in which the image of the property is selectively displayed based on the determination result of the group of the display target determining unit and the first group information of the property data.

According to such configuration, the privacy of the user can be more strongly protected.

The storage unit may store the property data further including second group information in which a display method defined with a detailed display or a simplified display for every property is set for every group; the display target determining unit may further determine a group based on the display request; and the data generating unit may generate the display data in which an image of the property displayed in detail or an image of the property displayed in a simplified manner is selectively displayed based on the determination result of the group of the display target determining unit and the second group information of the property data.

According to such configuration, the privacy of the user can be more strongly protected.

According to the embodiments of the present invention described above, there is provided a display data providing method used in an information processing device including a communication unit for communicating with a purchase history storage device for storing, for every user, purchase history data including article identification information for identifying an article and purchased time information indicating a time the article is purchased, and a display device for displaying an image; and a storage unit for storing user image data in which user identification information for identifying a user and a user image showing each user are recorded in correspondence to each other; the method including the steps of: acquiring the purchase history data from the purchase history storage device; generating property data in which a first property image showing a property owned by the user through purchase and the purchased time information are recorded in correspondence to each other based on the purchase history data acquired in the acquiring step, and recording the generated property data in the storage unit; updating the property data stored in the storage unit to property data including a second property image represented with a time interval from when the user purchased the property until present based on the purchased time information of the property data stored in the storage unit and time information defining a current time; generating display data shown with the user image showing a user which display is requested by a display request and an image of the property owned by the user based on the display request, the user image data, and the property data when receiving the display request transmitted from the display device; and transmitting the display data generated in the generating step to the display device transmitting the display request.

According to the use of such method, the information on the property based on the purchase behavior of the user can be shared among unspecified number of people while maintaining the privacy of the user.

According to the embodiments of the present invention described above, there is provided a program used in an information processing device including a communication unit for communicating with a purchase history storage device for storing, for every user, purchase history data including article identification information for identifying an article and purchased time information indicating a time the article is purchased, and a display device for displaying an image; and a storage unit for storing user image data in which user identification information for identifying a user and a user image showing each user are recorded in correspondence to each other; the program causing a computer to execute the steps of: acquiring the purchase history data from the purchase history storage device; generating property data in which a first property image showing a property owned by the user through purchase and the purchased time information are recorded in correspondence to each other based on the purchase history data acquired in the acquiring step, and recording the generated property data in the storage unit; updating the property data stored in the storage unit to property data including a second property image represented with a time interval from when the user purchased the property until present based on the purchased time information of the property data stored in the storage unit and time information defining a current time; generating display data shown with the user image showing a user which display is requested by a display request and an image of the property owned by the user based on the display request, the user image data, and the property data when receiving the display request transmitted from the display device; and transmitting the display data generated in the generating step to the display device transmitting the display request.

According to such program, the information on the property based on the purchase behavior of the user can be shared among unspecified number of people while maintaining the privacy of the user.

According to the embodiments of the present invention described above, the information on the property based on the purchase behavior of the user can be shared among unspecified number of people while maintaining the privacy of the user.

BRIEF DESCRIPTION OF THE DRAWINGS

FIG. 10 is an explanatory view showing one example of a user image database according to the embodiment of the present invention.

FIG. 11 is an explanatory view showing one example of a property database according to the embodiment of the present invention.

FIG. 12 is an explanatory view showing one example of an article image database according to the embodiment of the present invention.

DETAILED DESCRIPTION OF THE PREFERRED EMBODIMENTS

Figure 1A:
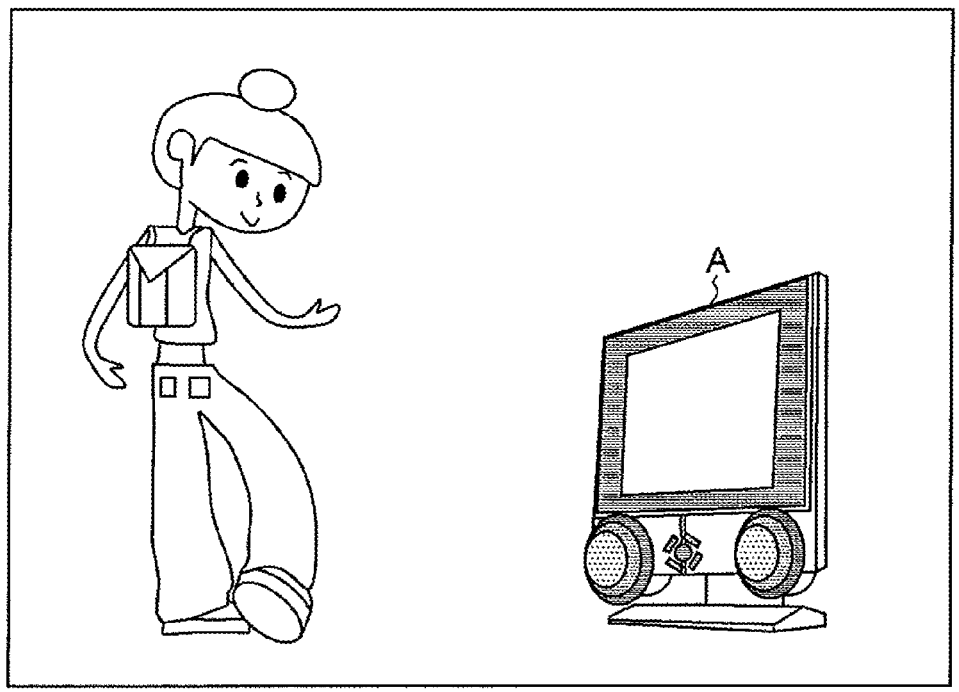
FIG. 1 is an explanatory view showing one example of display data according to an embodiment of the present invention.

Hereafter, preferred embodiments of the present invention will be described in detail with reference to the appended drawings. Note that in this specification and the appended drawings, structural elements that have substantially the same functions and structures are denoted with the same reference numerals and a repeated explanation of these structural elements is omitted.

(Brief Overview of Process of Information Processing Device According to an Embodiment of the Present Invention)

The brief overview of the process of the information processing device according to an embodiment of the present invention will be described before describing the configuration of the information processing device according to the embodiment of the present invention.

The information processing device according to the embodiment of the present invention enables the information on the property based on the purchase behavior of the user to be shared among unspecified number of people while maintaining the privacy of the user through the following processes (1) to (5).

(1) Acquire Purchase History Data of User

The information processing device according to the embodiment of the present invention acquires purchase history data of the user from a purchase history storage device (external device) and the like. The purchase history data according to the embodiment of the present invention is data including at least article identification information for identifying the article such as JAN (Japanese Article Number) code, and purchased time information indicating the time the article is purchased. The information included in the purchase history data according to the embodiment of the present invention is not limited to the above, and may include purchase source information indicating the purchase source from which the user purchased the article, information on payment method of the user indicating whether purchased on credit, and new/old information indicating whether the purchased article is new or used article. A purchase history storage device from which the information processing device according to the embodiment of the present invention acquires the purchase history data may be a server owned by a company issuing credit cards, a server owned by a distributor storing a membership and a purchased article in correspondence to each other, a server owned by a company operating a net shopping site, a server owned by a company issuing electronic money, and the like, but is not limited thereto.

(2) Generate Property Data

The information processing device according to the embodiment of the present invention generates and stores property data recorded with information on the property owned by the user based on the acquired purchase history data. The property data according to the embodiment of the present invention refers to data recorded with a property image showing the property owned by each user through purchase and the purchased time information in correspondence to each other.

The information processing device according to the embodiment of the present invention discriminates the article purchased by the user by the article identification information of the purchase history data, and acquires the property image by extracting from an article image database recorded with article images corresponding to the discriminated article. The property image corresponding to the image extracted from the article image database, or an image processed based on the image extracted from the article image database (e.g., image shown in FIG. 2G, FIG. 3, and FIG. 4, to be hereinafter described) is referred to as "first property image". The information processing device according to the embodiment of the present invention obtains the purchased time information from the purchase history data. The information contained in the property data according to the embodiment of the present invention is not limited to the above, and may include information defining display/non-display (disclosure/nondisclosure) of property display (correspond to first group information to be hereinafter described), and information defining the display method of the property image (correspond to second group information to be hereinafter described).

(3) Update Property Data

The information processing device according to the embodiment of the present invention generates the "second property image" represented with a time interval from when the user purchased the property until the present based on the purchased time information of the property data and the time information defining the current time with respect to the property data generated with respect to one property in (2), and updates to the property data including the generated second property image. The information processing device according to the embodiment of the present invention can represent the time-lapse information on each property owned by the user by images by updating the property data in the above manner. The updating of the owning data according to the embodiment of the present invention is not limited to being carried out once, and may be carried out over plural times according to elapse of time from the purchase. Thus, the second property image according to the embodiment of the present invention refers to the image represented with the time interval from when the user purchased the property until the present regardless of the number of updates.

(4) Generate Display Data

The information processing device according to the embodiment of the present invention generates display data indicating a user image showing the user, which display is requested by a display request, and the image of the property owned by the user according to the display request. The display request is transmitted from a display device (external device) connected by way of the network, but is not limited thereto. The image of the property configuring the display data corresponds to a first property image or a second property image.

The information processing device according to the embodiment of the present invention discriminates the user that becomes the target of generating the display data by the information on the user which display is requested by the display request, and extracts the image corresponding to the discriminated user from the user image data (e.g., user image database) recorded with the user identifying information for identifying the user and the user image respectively showing each user in correspondence to each other to thereby obtain the user image.

The information processing device according to the embodiment of the present invention assumes the first property image generated in (2) or the second property image generated in (3) as the image of the property. More specifically, if the first property image and one or more second property images are in the property data, the information processing device according to the embodiment of the present invention assumes the second property image recently generated with the time of generation of the display data as a reference as the image of the property configuring the display data with respect to the property owned by the discriminated user.

Furthermore, if the articles are different, such as the television manufactured by company A and the television manufactured by company B, but the article belonging to the same type of category or television exists in the property data, the information processing device according to the embodiment of the present invention assumes the property image of the property corresponding to the article which purchased time is recent with the time of generation of the display data as the reference as the image of the property configuring the display data. The information processing device according to the embodiment of the present invention can select an article which purchased time is recent with the time of generation of the display data as the reference based on the purchased time information of the property data. It can be recognized that the information processing device according to the embodiment of the present invention can assume the property image indicating each of all the properties owned by the user as the image of the property configuring the display data regardless of whether the same type of category.

Figure 1B:
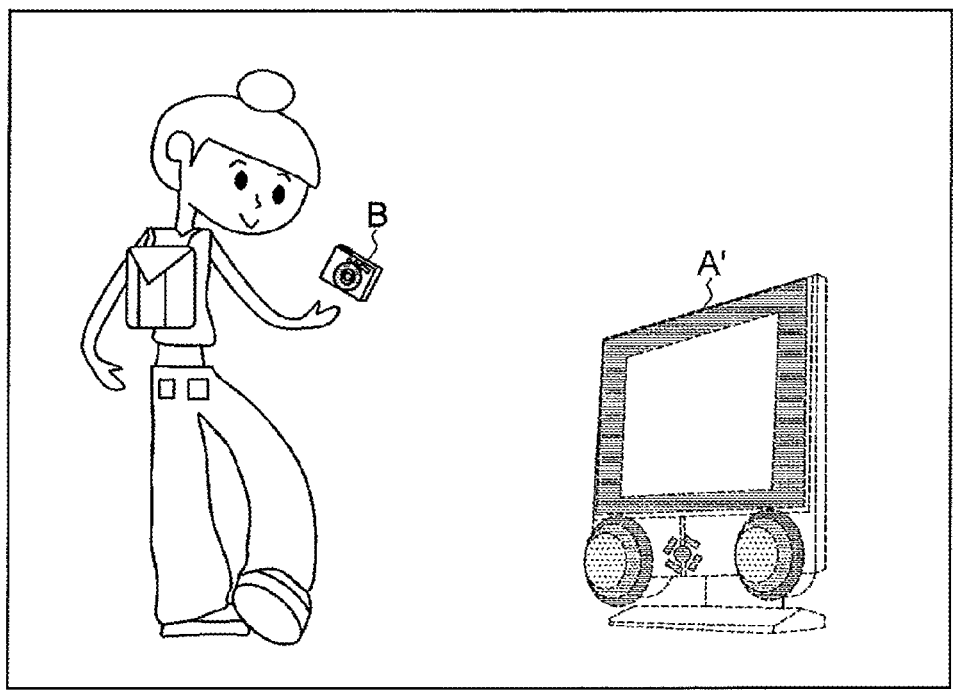

FIG. 1 is an explanatory view showing one example of the display data according to the embodiment of the present invention. FIG. 1A shows the display data generated at a first time point with respect to a certain user, and FIG. 1B shows the display data generated at a second time point (time point temporally elapsed from first time point) with respect to the user.

The information processing device according to the embodiment of the present invention selects the image of the property configuring the display data with the time of generation of the display data as the reference. Therefore, the information processing device according to the embodiment of the present invention can, for example, change the television (A of FIG. 1A) displayed on the display data generated at the first time point to the image represented with the time interval from when the user purchased the property until the present in the display data generated at the second time point (A' of FIG. 1B). The information processing device according to the embodiment of the present invention can display the camera not displayed in the display data generated at the first time point in the display data generated at the second time point (B of FIG. 1B).

(5) Transmit/Display Display Data

The information processing device according to the embodiment of the present invention transmits the display data generated in (4) to a device (e.g., display device connected by way of network) of the transmission source of the display request, and causes the device of the transmission source to display the display data. Therefore, the information processing device according to the embodiment of the present invention enables the information on the property based on the purchase behavior of the user to be shared among unspecified number of people through an image indirectly showing the information on the property based on the purchase behavior of the user.

The information processing device according to the embodiment of the present invention can generate the display data corresponding to the display request transmitted from the display device serving as the external device, and cause the display device to display the generated display data through the above processes (1) to (5). As shown in FIG. 1, the information processing device according to the embodiment of the present invention selects the image of the property configuring the display data with the time of generation of the display data as the reference, and thus can represent the information on the property based on the purchase behavior of the user by image after the property purchased a few years ago and the property purchased a few days ago clearly distinguished. Therefore, the image processing device according to the embodiment of the present invention enables the information on the property based on the purchase behavior of the user to be shared among unspecified number of people while maintaining the privacy of the user.

(Representation Example of the Image of the Property According to the Embodiment of the Present Invention)

One example of the display data according to the embodiment of the present invention is shown in FIG. 1, where change in the image of the property configuring the display data is shown with the time of generation of the display data as the reference, as shown in A of FIG. 1A and A' of FIG. 1B. This is realized when the property data is updated, and the second property image represented with the time interval from when the user purchased the property until the present is generated, as shown in (3). However, the change in the image of the property according to the embodiment of the present invention is not limited to the example shown in FIG. 1. The method of representing the image of the property according to the embodiment of the present invention will now be illustrated. The television will be described by way of example for comparison with the television shown in A of FIG. 1A and A' of FIG. 1B.

[1] First Example

Representation Method of Representing Change Based on Elapse of Time

First, the representation method of representing change based on elapse of time is shown as a first example of the change in the image of the property according to the embodiment of the present invention. The information processing device according to the embodiment of the present invention calculates the elapsed time from the purchase of the property and the like based on the purchased time information of the property data and the time information defining the current time, and generates the second property image corresponding to the calculated elapsed time to thereby change the display data based on the elapse of time. FIG. 2 is a first explanatory view showing a representation example of the image of the property according to the embodiment of the present invention.

Figure 2A:
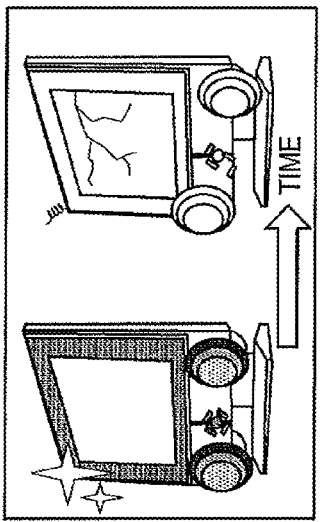
FIG. 2A is a first explanatory view showing a representation example of an image of a property according to the embodiment of the present invention.

[1-1] Change in Color (FIG. 2A)

The information processing device according to the embodiment of the present invention generates the second property image in which the color of the image is changed from a color image (first property image) to a sepia-toned image or a black and white image. The information processing device according to the embodiment of the present invention can represent the change of property based on the elapse of time by using color information as shown in FIG. 2A.

Figure 2D:
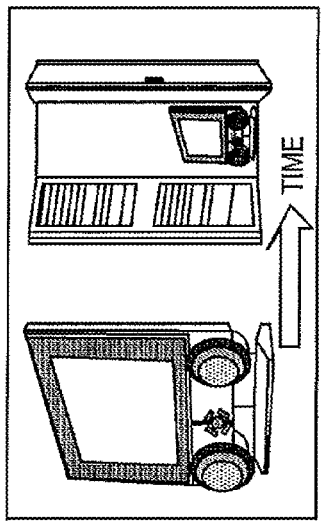
FIG. 2D is a first explanatory view showing a representation example of an image of a property according to the embodiment of the present invention.
Figure 2B:
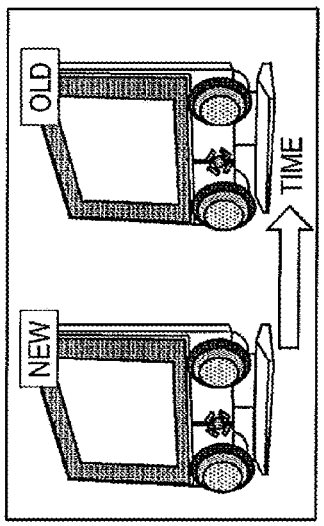
FIG. 2B is a first explanatory view showing a representation example of an image of a property according to the embodiment of the present invention.

[1-2] Change of Tag (FIG. 2B)

The information processing device according to the present invention generates the second property image in which the tag is changed from the image (first property image) given a "NEW" tag to the image given an "OLD" tag. The information processing device according to the present invention can represent the change of property based on the elapse of time by using character information as shown in FIG. 2B.

Figure 2E:
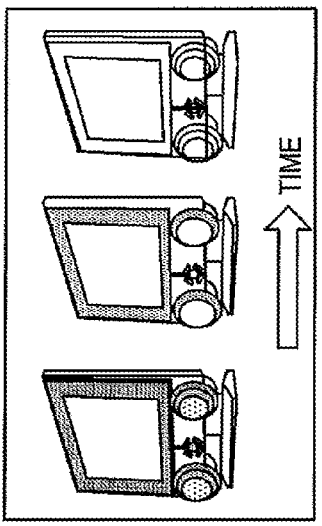
FIG. 2E is a first explanatory view showing a representation example of an image of a property according to the embodiment of the present invention.
Figure 2C:
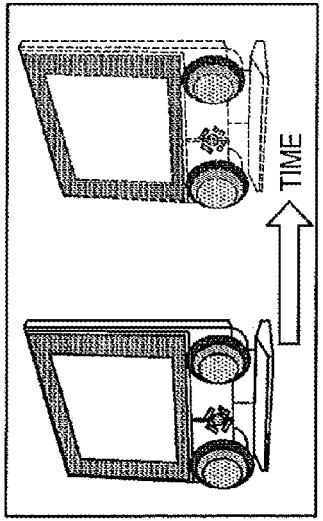
FIG. 2C is a first explanatory view showing a representation example of an image of a property according to the embodiment of the present invention.

[1-3] Change in Image (FIG. 2C)

The information processing device according to the present invention generates the second property image changed from the image (first property image) emphasizing newness to the image emphasizing oldness. The information processing device according to the present invention can represent the change of property based on the elapse of time by using visual information as shown in FIG. 2C.

[1-4] Change of Size (FIG. 2D)

The information processing device according to the present invention generates the second property image changed from the image (first property image) of size one to the image with gradually reduced size. The information processing device according to the present invention can represent the change of property based on the elapse of time by using visual information as shown in FIG. 2D.

[1-5] Change by Simplification of Image (FIG. 2E)

The information processing device according to the present invention generates the second property image in which one image (first property image) is changed to a gradually simplified image. The information processing device according to the present invention can represent the change of property based on the elapse of time by using visual information as shown in FIG. 2E.

Figure 2F:
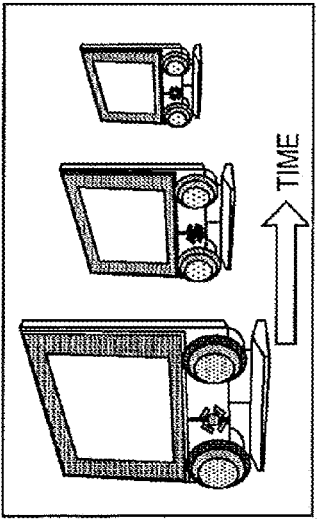
FIG. 2F is a first explanatory view showing a representation example of an image of a property according to the embodiment of the present invention.

[1-6] Change to Image Showing Storage (FIG. 2F)

The information processing device according to the present invention generates the second property image in which one image (first property image) is changed to an image showing storage. The information processing device according to the present invention can represent the change of property based on the elapse of time by using visual information as shown in FIG. 2F.

Figure 2G:
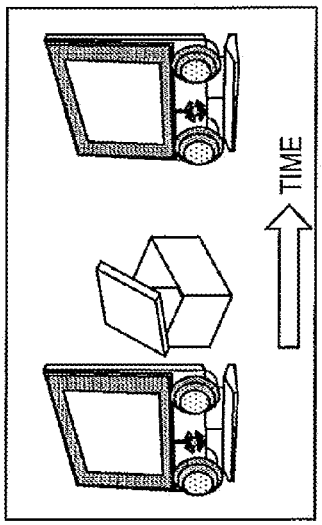
FIG. 2G is a first explanatory view showing a representation example of an image of a property according to the embodiment of the present invention.

[1-7] Change from Image Showing Immediately after Purchase (FIG. 2G)

The information processing device according to the present invention generates the second property image changed from an image (first property image) in which the image of the article and the image of the box are shown side by side indicating immediately after purchase to an image of only the article. The information processing device according to the present invention can represent the change of property based on the elapse of time by using visual information as shown in FIG. 2G.

The information processing device according to the present invention can change the display data based on the elapse of time by generating the second property image as shown in [1-1] to [1-7]. It is to be noted that the method of showing the change based on the elapse of time according to the embodiment of the present invention is not limited to the above.

[2] Second Example

Representation Method of Representing Change Based on Payment Method

A representation method of representing change based on payment method will be described as a second example of the change in the image of the property according to the embodiment of the present invention. The information processing device according to the embodiment of the present invention acquires information such as whether the user purchased on credit or the number of loans based on the information on the payment method of the user included in the purchase history data. The information processing device according to the embodiment of the present invention changes the display data based on the payment method by generating the first property image and the second property image based on the acquired information, the purchased time information of the property data, and the time information defining the current time. FIG. 3 is a second explanatory view showing a representation example of the image of the property according to the embodiment of the present invention.

Figure 3A:
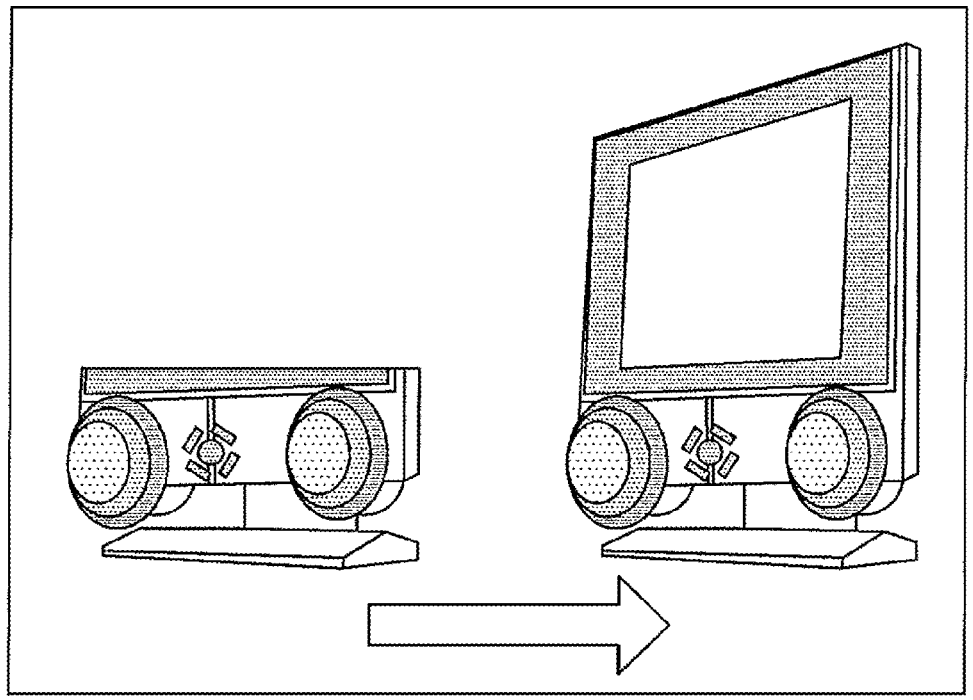
FIG. 3A is a second explanatory view showing a representation example of an image of a property according to the embodiment of the present invention.

[2-1] Change in Display Location (FIG. 3A)

The information processing device according to the embodiment of the present invention generates the second property image in which an image (first property image) where one part of the image of the property is displayed is changed to an image in which the displaying range gradually becomes larger according to reduction in balance of the loan or reduction in the number of loans. The information processing device according to the embodiment of the present invention can represent the change in property based on the payment method by using visual information as shown in FIG. 3A.

Figure 3B:
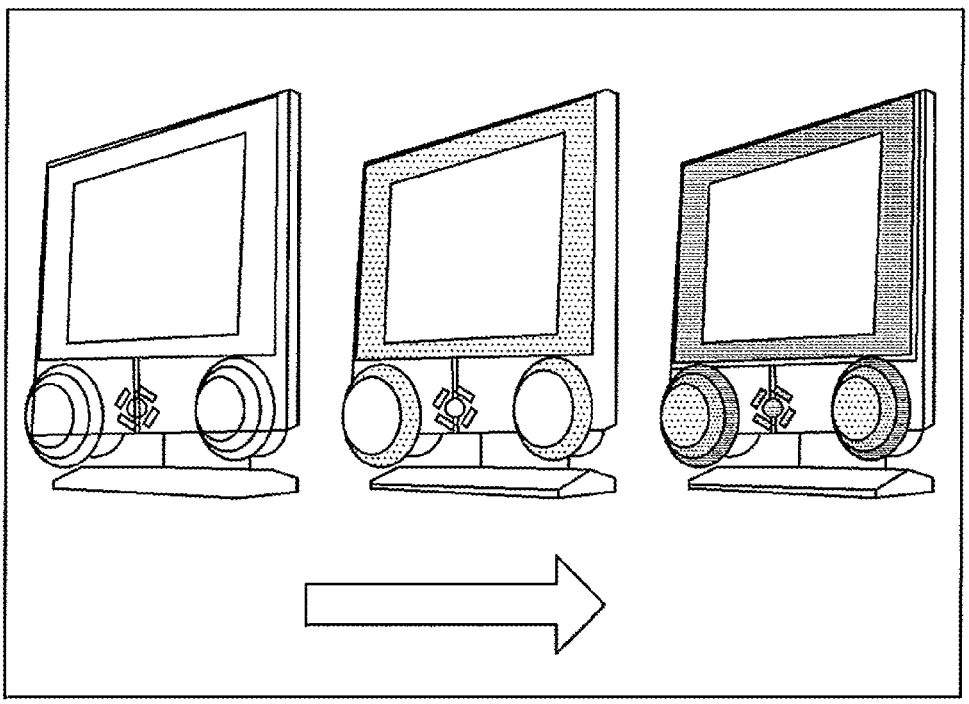
FIG. 3B is a second explanatory view showing a representation example of an image of a property according to the embodiment of the present invention.

[2-2] Change in Details of Image (FIG. 3B)

The information processing device according to the embodiment of the present invention generates the second property image in which a simplified image (first property image) of the property is gradually changed to a detailed image according to reduction in balance of the loan or reduction in the number of loans. The information processing device according to the embodiment of the present invention can represent the change in property based on the payment method by using visual information as shown in FIG. 3B.

The information processing device according to the present invention can change the display data based on the payment method by generating the first property image and the second property image as shown in [2-1] and [2-2]. It is to be noted that the method of showing the change based on the payment method according to the embodiment of the present invention is not limited to the above.

[3] Third Example

Representation Method of Representing Article Obtaining Method

The representation methods of the change in image based on elapse of time and payment method have been shown in [1] and [2]. However, the representation method of the image according to the embodiment of the present invention is not limited thereto, and the article obtaining method may be represented. The information processing device according to the embodiment of the present invention acquires purchase source information indicating the purchase source from which the user purchased the article, information indicating new/old of the article, and the like from the purchase history data. The information processing device according to the embodiment of the present invention generates the image of the property representing the article obtaining method by specifying the manner of obtaining the property, the new/old of the property, and the like based on the acquired information. FIG. 4 is a third explanatory view showing a representation example of the image of the property according to the embodiment of the present invention.

Figure 4A:
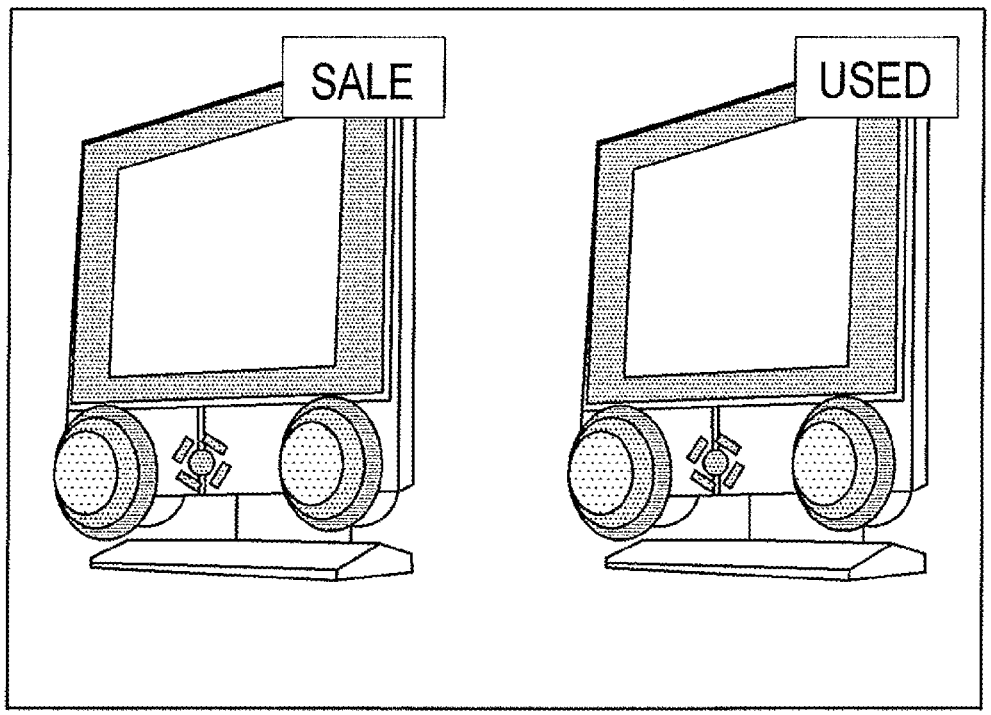
FIG. 4A is a third explanatory view showing a representation example of an image of a property according to the embodiment of the present invention.

[3-1] Representation of Obtaining Method by Tag (FIG. 4A)

The information processing device according to the embodiment of the present invention generates an image (first property image) with a tag such as "SALE" or "USED". The information processing device according to the embodiment of the present invention can represent how the user obtained the property using visual information as shown in FIG. 4A.

Figure 4B:
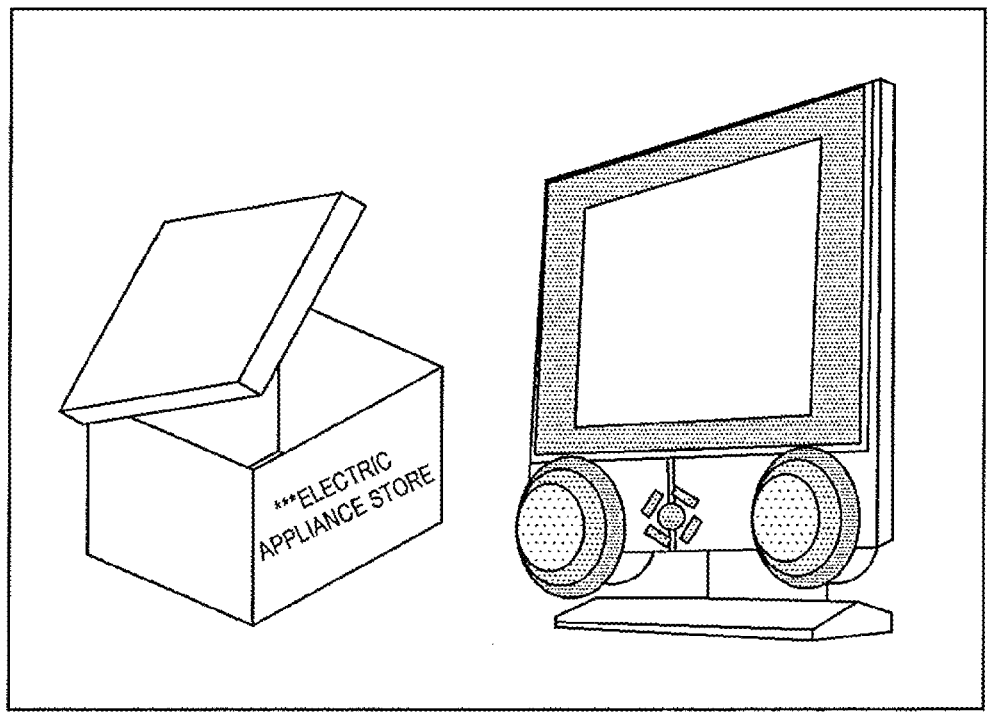
FIG. 4B is a third explanatory view showing a representation example of an image of a property according to the embodiment of the present invention.

[3-2] Representation of Obtaining Method by Image Showing Purchase Source (FIG. 4B)

The information processing device according to the embodiment of the present invention generates an image (first property image) in which an image showing a box or a wrapping paper indicated with the purchase source and an image of the article are shown side by side. The information processing device according to the embodiment of the present invention can represent from where the user obtained the property using visual information as shown in FIG. 4B.

The information processing device according to the present invention can generate the image of the property representing the article obtaining method by generating the first property image as shown in [3-1] and [3-2]. It is to be noted that the method of showing the article obtaining method according to the embodiment of the present invention is not limited to the above. The information processing device according to the embodiment of the present invention can visually represent how and from where the user obtained the property by combining [3-1] and [3-2].

[4] Fourth Example

Representation Method of History of Property

The representation methods related to one property, using television as one example of property, have been described in [1] to [3]. A method of representing the history of the property of the user is shown below as another representation method of the image of the property in the information processing device according to the embodiment of the present invention. FIG. 5 is a fourth explanatory view showing a representation example of an image of the property according to the embodiment of the present invention. FIG. 5 shows a display screen displayed with the display data generated by the information processing device according to the embodiment of the present invention on the display device.

Figure 5A:
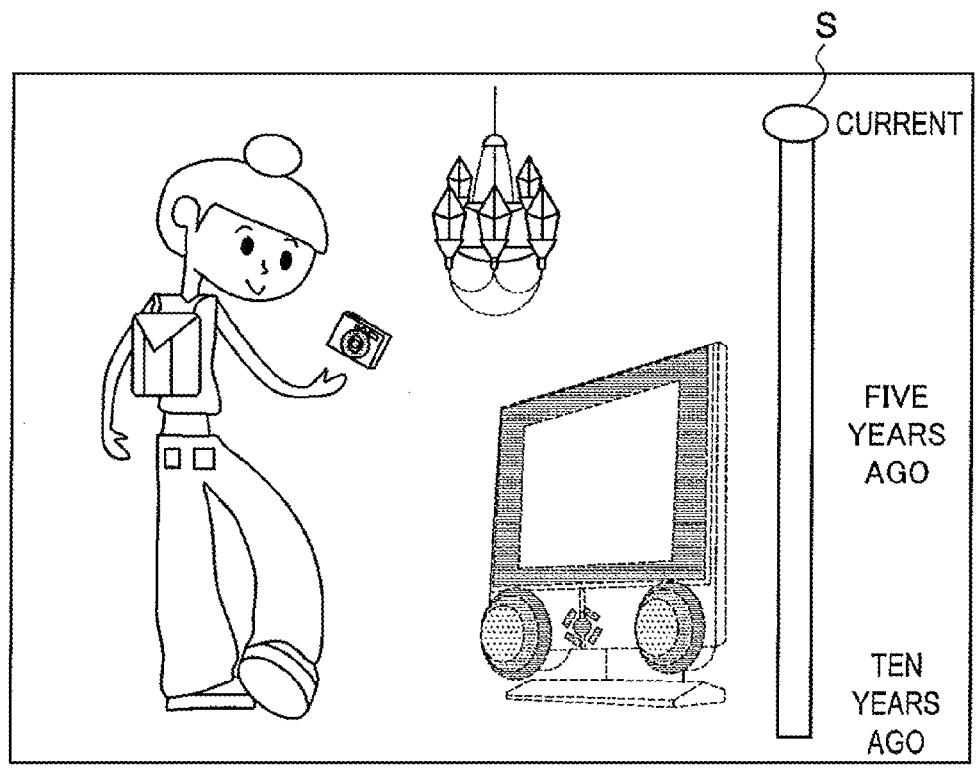
FIG. 5A is a fourth explanatory view showing a representation example of an image of a property according to the embodiment of the present invention.
Figure 5B:
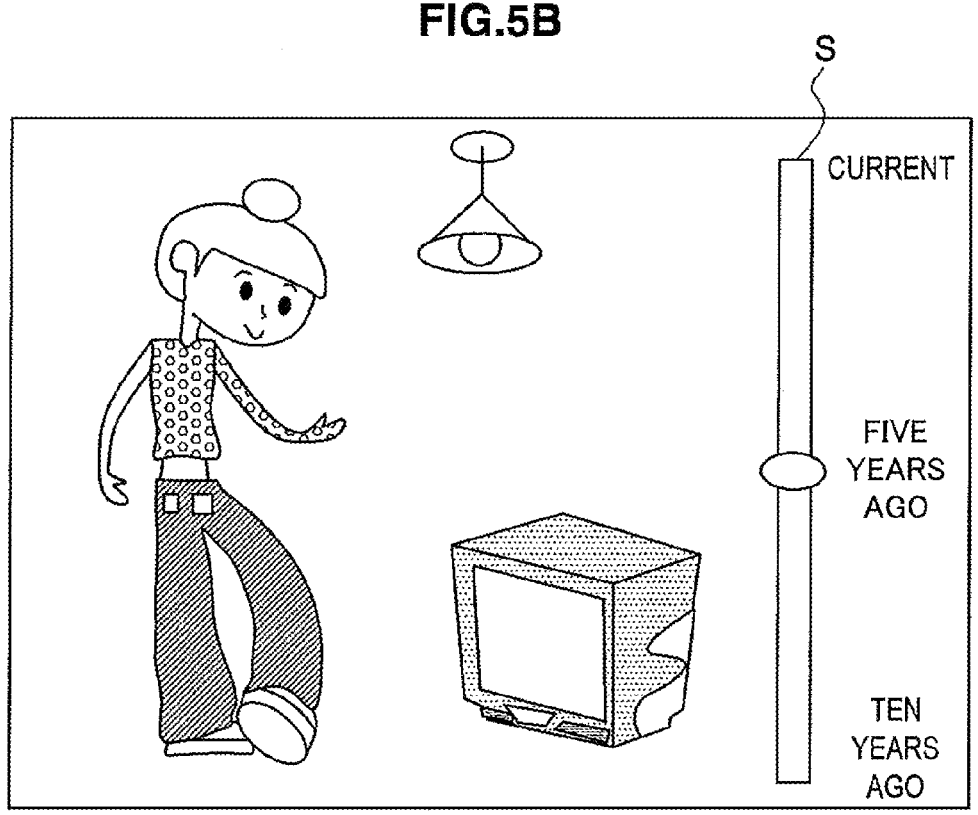
FIG. 5B is a fourth explanatory view showing a representation example of an image of a property according to the embodiment of the present invention.

As shown in FIG. 5, the display data according to the embodiment of the present invention has a slide bar S for showing the property of the user for every specified time. The display data according to the embodiment of the present invention shows the image of the property owned by the user at the specified time indicated by the slide bar S every time the time indicated by the slide bar S is changed. For instance, FIG. 5A shows the property of the user at the time the display data is generated, and FIG. 5B shows the property of the user five years ago with the time the display data is generated as the reference. The information processing device according to the embodiment of the present invention may generate the display data representing the history of the property of the user as shown in FIG. 5 by grouping beforehand the image of the property corresponding to each value specifiable by the slide bar S, but is not limited thereto.

The information processing device according to the embodiment of the present invention represents the history of the property of the user, and enables the information on the history of the property of the user to be shared among unspecified number of people by generating the display data as shown in FIG. 5.

[5] Fifth Example

Selective Representation Method Using Group Information

As described above, the information processing device according to the embodiment of the present invention can generate the display data according to the display request transmitted from the display device. However, the information processing device according to the embodiment of the present invention is not limited to generating the same display data when receiving the display request, and may generate different display data for every device transmitting the display request.

The information processing device according to the embodiment of the present invention generates different display data for every device transmitting the display request by including group information referenced in time of generating the display data in the property data. More specifically, the information processing device according to the embodiment of the present invention determines the group based on the display request, and generates the display data selectively represented with each property based on the determination result of the group and the group information in the property data. The information processing device according to the embodiment of the present invention can determine the group based on device identification information such as IP address (Internet Protocol Address) and MAC address (Media Access Control Address) included in the display request, but is not limited thereto. The selective representation method using the group information according to the embodiment of the present invention will be specifically described below.

[5-1] Display/Non-Display of Property Image Using Group Information

Figure 6A:
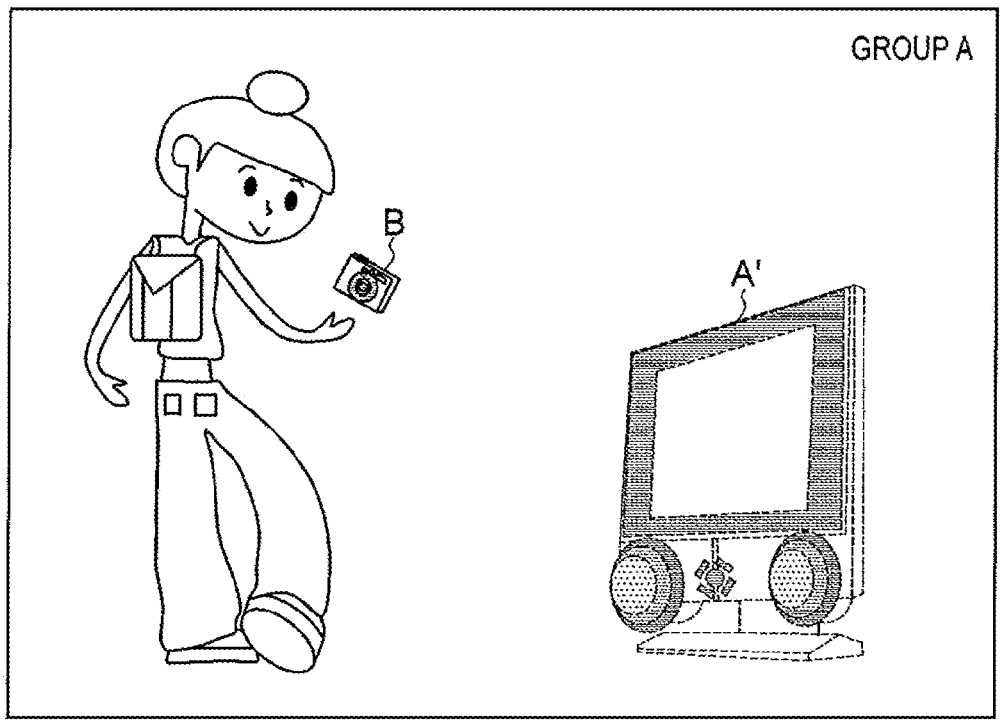
FIG. 6A is a fifth explanatory view showing a representation example of an image of a property according to the embodiment of the present invention.
Figure 6B:
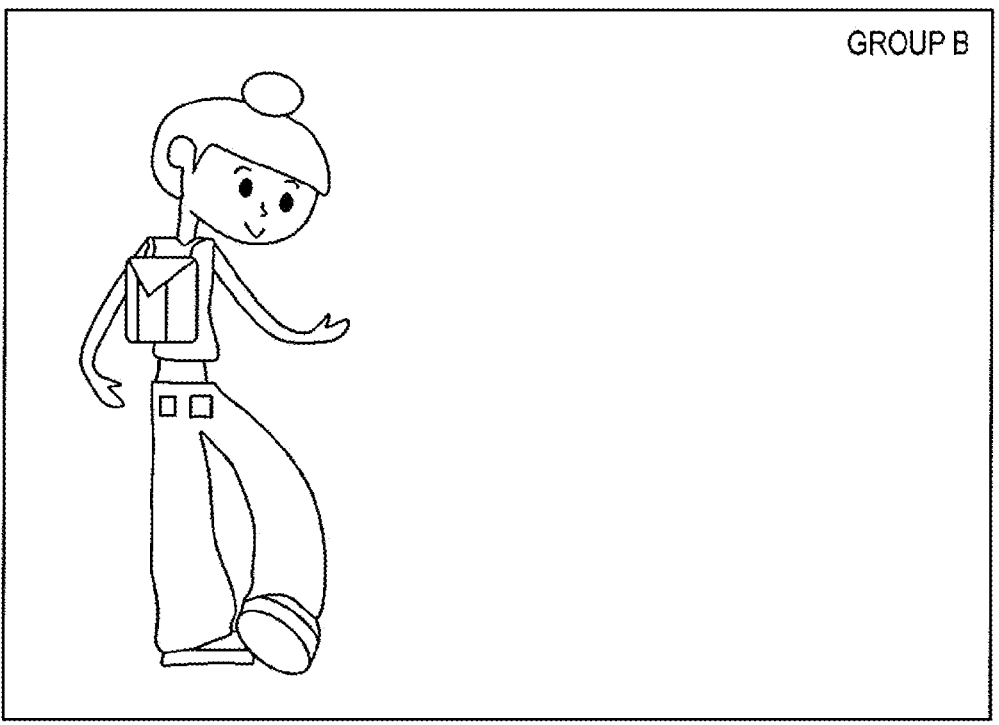
FIG. 6B is a fifth explanatory view showing a representation example of an image of a property according to the embodiment of the present invention.

FIG. 6 is a fifth explanatory view showing a representation example of the image of the property according to the embodiment of the present invention, and shows a first example of the selective representation method using group information. Here, FIG. 6 shows a display screen (FIG. 6A) displayed on one display device belonging to group A in the group information of the property data, and a display screen (FIG. 6B) displayed on another display device belonging to group B in the group information of the property data, where the display devices transmitted the display request at substantially the same time.

As shown in FIGS. 6A and 6B, a television A and a camera B displayed on the display screen of the display device belonging to the group A are not displayed on the display screen of the display device belonging to the group B. As shown in FIG. 6, the information processing device according to the embodiment of the present invention can change the generating display data according to the device transmitting the display request.

[5-2] Simplification/Detailing of the Property Image Using Group Information

Figure 7A:
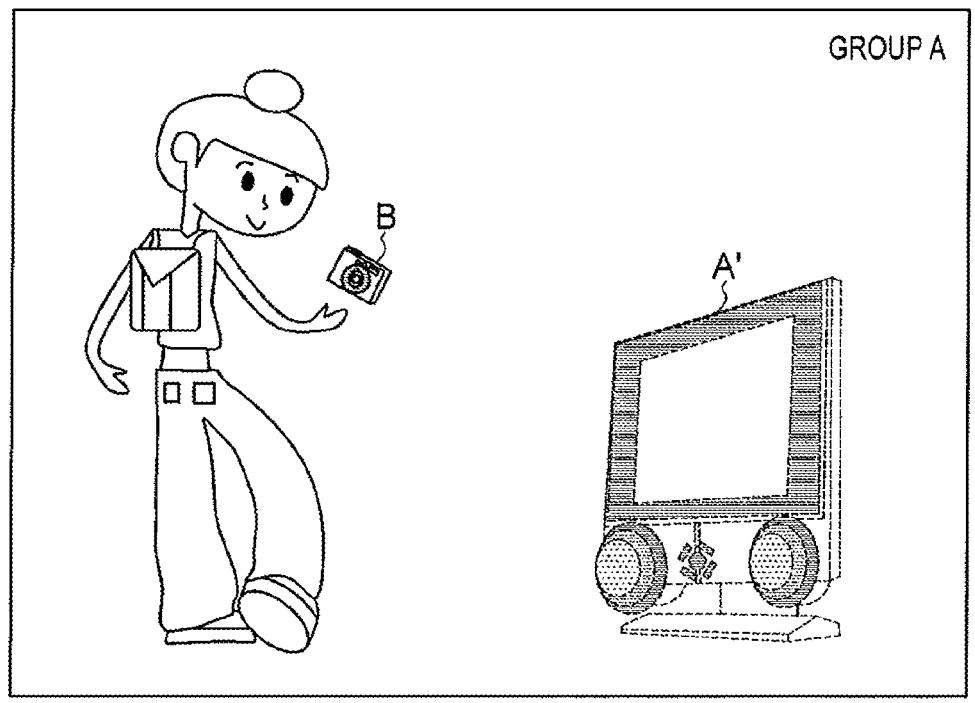
FIG. 7A is a sixth explanatory view showing a representation example of an image of a property according to the embodiment of the present invention.
Figure 7B:
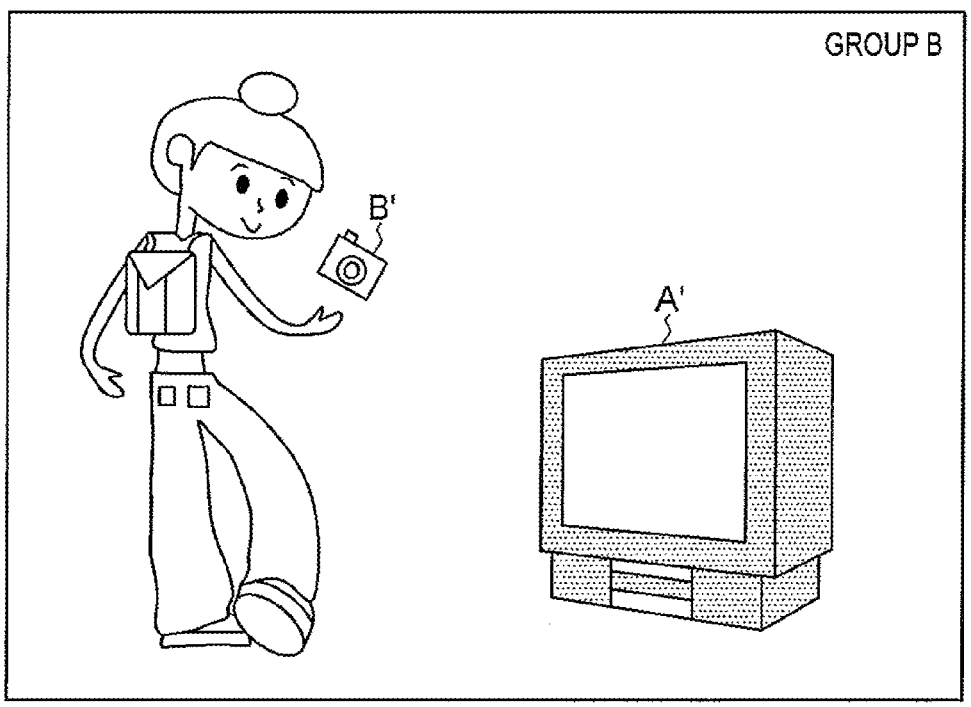
FIG. 7B is a sixth explanatory view showing a representation example of an image of a property according to the embodiment of the present invention.

The selective representation method using the group information according to the embodiment of the present invention is not limited to display/non-display of the property image. FIG. 7 is a sixth explanatory view showing a representation example of the image of the property according to the embodiment of the present invention, and shows a second example of the selective representation method using the group information. Similar to FIG. 6, FIG. 7 shows a display screen (FIG. 7A) displayed on one display device belonging to group A in the group information of the property data, and a display screen (FIG. 7B) displayed on another display device belonging to group B in the group information of the property data, where the display devices transmitted the display request at substantially the same time.

As shown in FIGS. 7A and 7B, a television A and a camera B shown in detail in the display screen of the display device belonging to the group A are shown in a simplified image (television A" and camera B') in the display screen of the display device belonging to the group B. The detailed image according to the embodiment of the present invention includes an image in which the shape of the article is shown to detail and an image in which the manufacturing company and the model number of the article are shown, but is not limited thereto. As shown in FIG. 7, the information processing device according to the embodiment of the present invention can change the generating display data according to the device transmitting the display request.

The information processing device according to the embodiment of the present invention can selectively represent the image of the property configuring the display data using the group information by generating the display data as shown in FIGS. 6 and 7. As the image of the property configuring the display data is selectively represented using the group information, the information processing device according to the embodiment of the present invention can separately perform the display to close friends and families, and the display to unspecified person. Therefore, the information processing device according to the embodiment of the present invention not only provides the information on the property of the user to unspecified number of people by image, but also selectively provides the information on the property of the user, and thus the privacy of the user can be more strongly protected. It to be noted that the representation method using the group information according to the embodiment of the present invention is not limited thereto. For instance, the information processing device according to the embodiment of the present invention can perform a finer display control for every property of the user by combining [5-1] and [5-2].

The display device according to the embodiment of the present invention generates the display data represented with the image of the property based on the purchase behavior as shown in FIGS. 2 to 7, transmits the same to the device of the transmission source of the display request, and causes the device of the transmission source of the display request to display the image indicated by the display data. Therefore, the display device according to the embodiment of the present invention enables the information on the property based on the purchase behavior of the user to be shared among unspecified number of people while maintaining the privacy of the user. The configuration of a property information providing system and the information processing device according to the embodiment of the present invention will now be specifically described.

(Property Information Providing System According to the Embodiment of the Present Invention)

Figure 8:
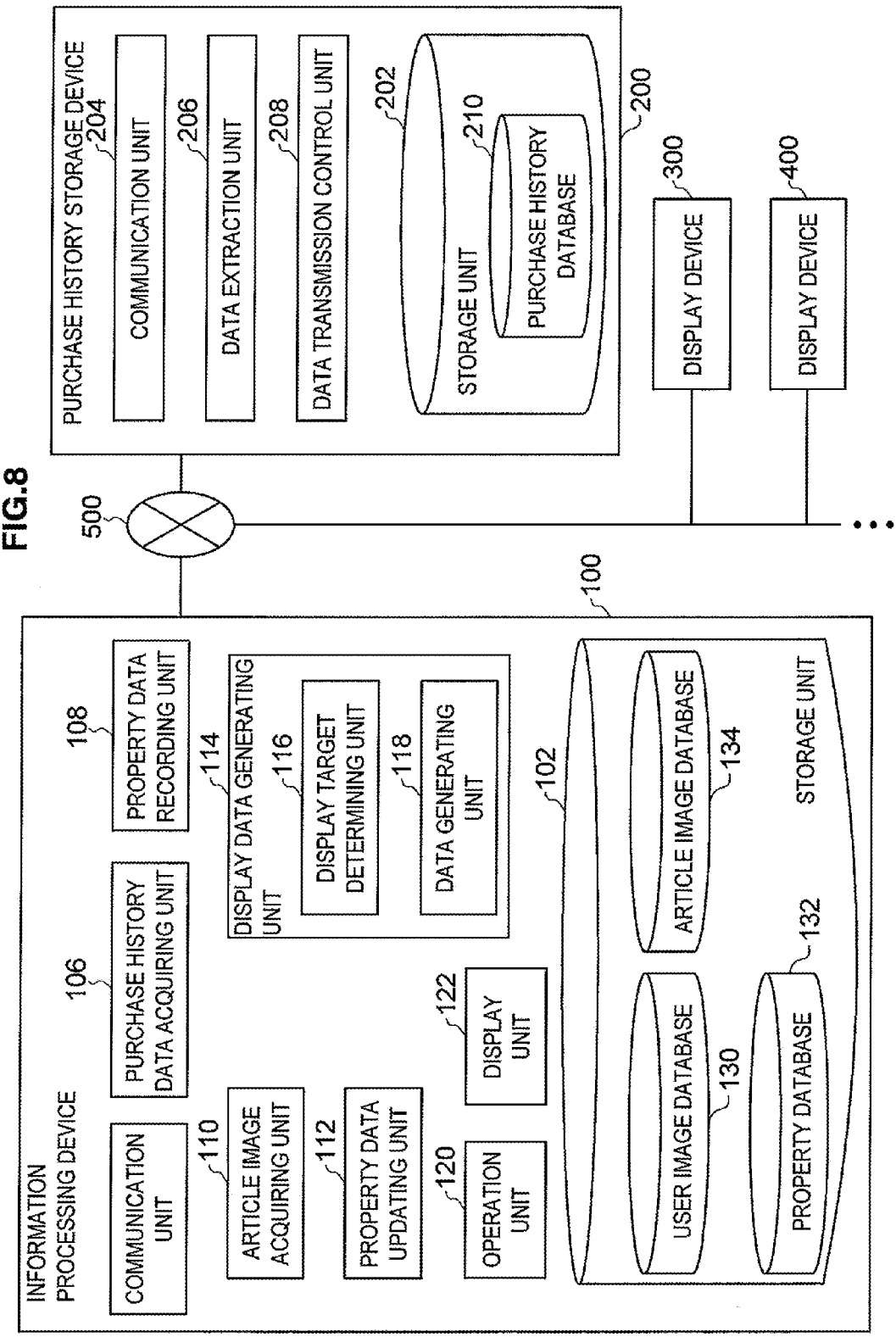
FIG. 8 is a block diagram showing a property information providing system according to the embodiment of the present invention.

FIG. 8 is a block diagram showing a property information providing system 1000 according to the embodiment of the present invention. With reference to FIG. 8, the property information providing system 1000 includes a purchase history storage device 200, display devices 300, 400, . . . , and an information processing device 100. The information processing device 100, and the purchase history storage device 200 and each display device are connected with a network 500.

The network 500 may be a wired network such as LAN (Local Area Network) or WAN (Wide Area Network); a wireless network such as WLAN (Wireless Local Area Network) using MIMO (Multiple-Input Multiple-Output); or Internet using communication protocol such as TCP/IP(Transmission Control Protocol/Internet Protocol), but is not limited thereto. The information processing device 100, and the purchase history storage device 200 and each display device are connected by way of a wireless base station, and the like.

[Purchase History Storage Device 200]

The purchase history storage device 200 includes a storage unit 202, a communication unit 204, a data extraction unit 206, and a data transmission control unit 208, and transmits the purchase history data to the information processing device 100 in response to a purchase history data acquisition request from the information processing device 100.

The purchase history storage device 200 may include a control unit (not shown), configured to include MPU (Micro Processing Unit) and the like, for performing various calculation processes using a control program etc. and controlling the entire purchase history storage device 200; a ROM (Read Only Memory; not shown) recorded with control data such as program used by the control unit (not shown) and calculation parameter; a RAM (Random Access Memory; not shown) for primary storing program etc. executed by the control unit (not shown); an operation unit (not shown) operable by the user of the purchase history storage device 200; a display unit (not shown) and the like. The purchase history storage device 200 connects each components with a bus serving as a data transmission path.

The operation unit (not shown) may be an operation input device such as keyboard and mouse, a button, a direction key, or a rotary selector such as jog dial, or a combination thereof, but is not limited thereto. The display unit (not shown) may be an LCD (Liquid Crystal Display), an organic EL display (referred to as Organic Electro-Luminescence display; or OLED display (Organic Light Emitting Diode display)), but is not limited thereto.

The storage unit 202 is a storage means arranged in the purchase history storage device 200. The storage unit 202 is stored with a purchase history database 210 stored with purchase history data of each user. In FIG. 8, an example where the purchase history data is recorded in a database format in the storage unit 202 is shown, but is not limited thereto, and may be recorded in a file format.

The storage unit 202 includes a magnetic recording medium such as hard disk, and a nonvolatile memory such as flash memory, but is not limited thereto.

The communication unit 204 communicates with the information processing device 100 etc. through the network 500. More specifically, the communication unit 204 receives an acquisition request of the purchase history data transmitted from the information processing device 100, and transmits the purchase history data based on the acquisition request to the information processing device 100.

The data extraction unit 206 is configured to include MPU and the like, and searches the purchase history database 210 of the storage unit 202 based on the acquisition request of the purchase history data received by the communication unit 204, and extracts the purchase history data adapted to the acquisition request. The data extraction unit 206 converts the acquisition request of the purchase history data received by the communication unit 204 to a database language such as SQL to extract service information from the purchase history database 210, but is not limited thereto.

The data transmission control unit 208 is configured to include MPU and the like, and transmits the purchase history data extracted by the data extraction unit 206 to the information processing device 100 transmitting the acquisition request of the purchase history data.

The purchase history storage device 200 can transmit the purchase history data adapted to the acquisition request of the purchase history data transmitted from the information processing device 100 to the information processing device 100 according to the above configuration.

[Display Device 300, 400, . . . ]

Each display device 300, 400, . . . includes a communication unit (not shown), a display request generating unit (not shown), and a display unit (not shown), transmits the display request to the information processing device 100 via the network 500, and receives and displays the display data transmitted according to the display request from the information processing device 100.

Each display device 300, 400, . . . may include a control unit (not shown), configured to include MPU and the like, for performing various calculation processes using a control program etc. and controlling the entire display device; a ROM (not shown) recorded with control data such as program used by the control unit and calculation parameter; a RAM (not shown) for primary storing the program and the like to be executed by the control unit, and the like. Each display device 300, 400, . . . connects each component with a bus serving as the data transmission path.

The communication unit (not shown) communicates with the information processing device 100 and the like through the network 500. More specifically, the communication unit (not shown) transmits the display request to the information processing device 100, and receives the display data transmitted according to the display request from the information processing device 100.

The display request generating unit (not shown) is configured to include MPU and the like, and generates the display request having information such as user ID which display of the information on the property is desired, and device identification information (e.g., MAC address) for identifying the display device, and transmits the generated display request to the communication unit 204.

The display unit (not shown) displays an image indicated by the display data received by the communication unit on a display screen. The display unit (not shown) may be LCD or organic EL display, but is not limited thereto.

Each display device 300, 400, . . . can transmit the display request to the information processing device 100, and receive and display the display data transmitted according to the display request from the information processing device 100 according to the above configuration.

[Information Processing Device 100]

The information processing device 100 according to the embodiment of the present invention will now be described.

The information processing device 100 includes a storage unit 102, a communication unit 104, a purchase history data acquiring unit 106, a property data recording unit 108, an article image acquiring unit 110, a property data updating unit 112, a display data generating unit 114, an operation unit 120, and a display unit 122.

The information processing device 100 may include a control unit (not shown), configured to include MPU and the like, for performing various calculation processes using a control program etc. and controlling the entire information processing device 100; a ROM (not shown) recorded with control data such program used by the control unit and calculation parameter; a RAM (not shown) for primary storing the program and the like executed by the control unit, and the like. The information processing device 100 connects each components with a bus serving as the data transmission path. The control unit may also function as the purchase history data acquiring unit 106, the property data recording unit 108, the article image acquiring unit 110, the property data updating unit 112, and the display data generating unit 114.

[Hardware Configuration Example of Information Processing Device 100]

Figure 9:
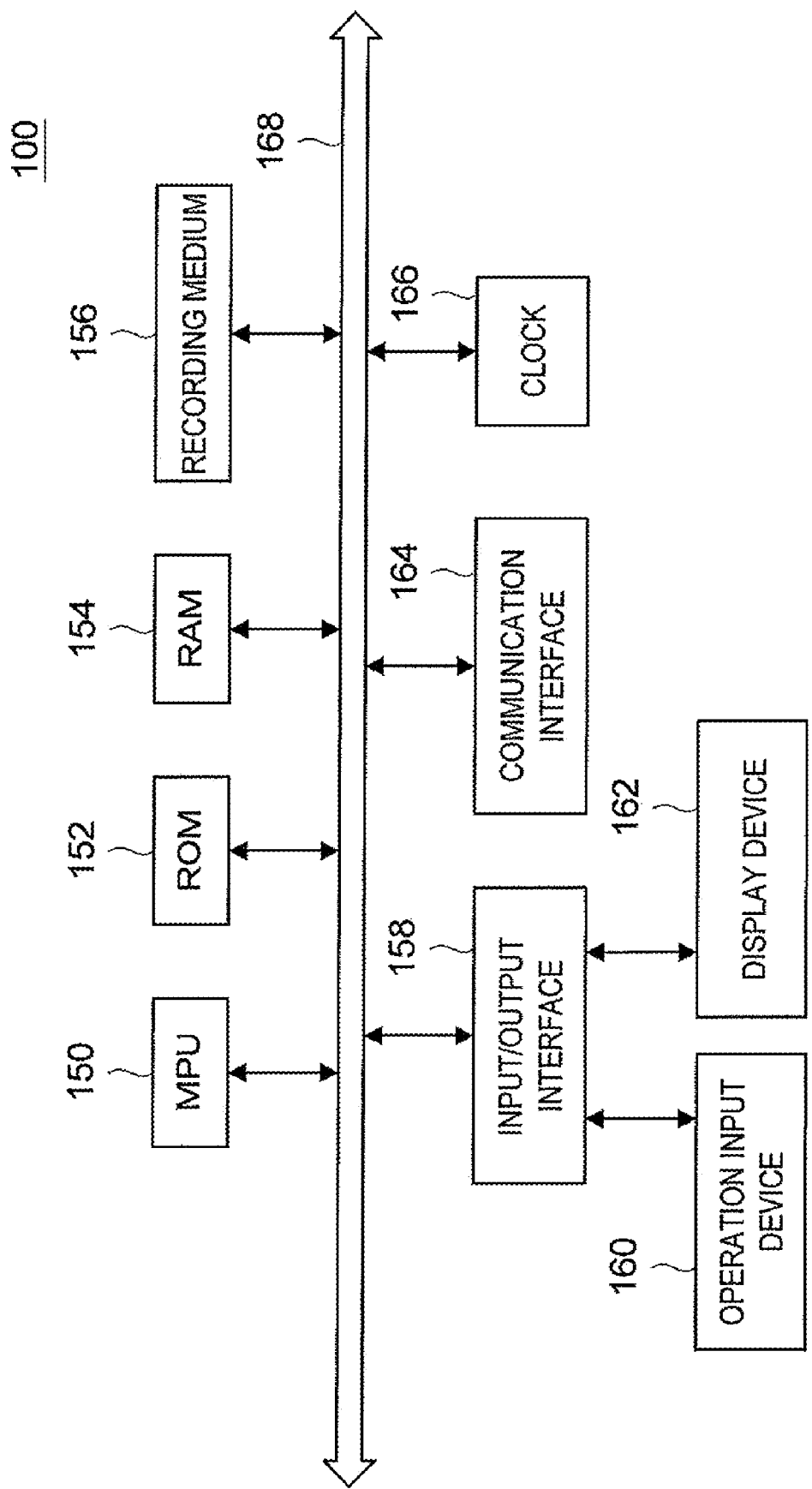
FIG. 9 is an explanatory view showing one example of a hardware configuration of the information processing device according to the embodiment of the present invention.

FIG. 9 is an explanatory view showing one example of a hardware configuration of the information processing device 100 according to the embodiment of the present invention. With reference to FIG. 9, the information processing device 100 includes an MPU 150, a ROM 152, a RAM 154, a recording medium 156, an input/output interface 158, an operation input device 160, a display device 162, a communication interface 164, and a clock 166. The information processing device 100 connects each component with a bus 168 serving as the data transmission path.

The MPU 150 functions as a control unit for controlling the entire information processing device 100. The MPU 150 also serves as the purchase history data acquiring unit 106, the property data recording unit 108, the article image acquiring unit 110, the property data updating unit 112, and the display data generating unit 114 in the information processing device 100.

The ROM 152 stores the control data such as the program and the calculation parameter used by the MPU 150, and the RAM 154 primary stores the program executed by the MPU 150.

The recording medium 156 functions as the storage unit 102 of the information processing device 100, and stores, for example, the generated display data, the purchase history data acquired from the purchase history storage device 200, the application, and the like. The recording medium 156 may be a magnetic recording medium such as hard disk, or a non-volatile memory such as EEPROM, flash memory, MRAM (Magnetoresistive Random Access Memory), FeRAM (Ferroelectric Random Access Memory), PRAM(Phase change Random Access Memory) and the like, but is not limited thereto.

The input/output interface 158 connects the operation input device 160 and the display device 162. The input/output interface 158 may be a USB (Universal Serial Bus) terminal, a DVI (Digital Visual Interface) terminal, an HDMI (High-Definition Multimedia Interface) terminal, and the like, but is not limited thereto. The operation input device 160 is arranged on the information processing device 100, and is connected with the input/output interface 158 at the interior of the information processing device 100. The operation input device 160 may be a button, a direction key, a rotary selector such as jog dial, or a combination thereof. The display device 162 is arranged on the information processing device 100, and is connected with the input/output interface 158 at the interior of the information processing device 100. The display device 162 may be a LCD, an organic EL display, and the like. It is to be noted that the input/output interface 158 can be connected with the operation input device (e.g., keyboard, mouse, and the like) and the display device (e.g., external display and the like) serving as the external device of the information processing device 100.

The operation input device 160 functions as the operation unit 120, and the display device 162 functions as the display unit 122.

The communication interface 164 is an interface for communicating with the external device, and functions as the communication unit 104. The communication interface 164 includes a LAN terminal, an IEEE 802.11 port, a RF (Radio Frequency) circuit and the like, but is not limited thereto.

The clock 166 generates the time information for defining the generated time etc. of the display data. The clock 166 includes a mechanical clock, a quartz clock, an atomic clock, and the like, but is not limited thereto.

According to the hardware configuration shown in FIG. 9, the information processing device 100 performs the processes of (1) to (5), generates the display data corresponding to the display request transmitted from the display device, and causes the display device to display the generated display data.

Each component of the information processing device 100 will be described with reference again to FIG. 8. The storage unit 102 is a storage means arranged in the information processing device 100. The storage unit 102 is stored with user image data, property data, and article image data.

The user image data is recorded with the user identification information (e.g., user ID) for identifying the user and the user image showing each user in correspondence to every user. The property data is recorded with the property image (first property image/second property image described above) showing the property owned by each user through purchase and the purchased time information indicating the time the article is purchased in correspondence to each other. The article image data is recorded with the article identification information (e.g., JAN code) for identifying the article and the article image corresponding to each article in correspondence to each other.

The storage unit 102 may store the generated display data, the purchase history data acquired from the purchase history storage device 200, the group information (e.g., stored as group database), the application, and the like. In FIG. 8, an example where a user image database 130 recorded with the user image data, a property database 132 recorded with the property data, and an article image database 134 recorded with the article image data are stored in the storage unit 102 is shown. In FIG. 8, an example where the user image data, the property data, and the article image data are respectively recorded in a database format in the storage unit 202 is shown, but is not limited thereto, and may be recorded in a file format.

[Example of User Image Database 130]

FIG. 10 is an explanatory view showing one example of the user image database 130 according to the embodiment of the present invention. As shown in FIG. 10, the user image database 130 is stored with "user ID" identifying each user, "user name" indicating the name of each user, and "image data" indicating each user in image. Each row shown in FIG. 10 corresponds to the user image data corresponding to one user.

[Example of Property Database 132]

FIG. 11 is an explanatory view showing one example of the property database 132 according to the embodiment of the present invention. As shown in FIG. 11, the property database 132 is stored with "user ID", "property" indicating the property owned by each user, "purchased date" indicating the purchased date of each property, "obtaining method" defined with the obtaining method of each property, "image data" indicating the first property image or the second property image in each property, "image data registered date and time" indicating the date and time each image data is registered, and "group A display decision" (display decision corresponds to first group information) to "group B display method" (display method corresponds to second group information) indicating the group information. Each row shown in FIG. 11 corresponds to the property data corresponding to one property.

Furthermore, as described above, the information processing device 100 according to the embodiment of the present invention updates the property data based on the purchased time information and the time information defining the current time of the property data, and thus a plurality of property data is recorded with respect to one property in the property database 132. In FIG. 11, an example where the property data of one user or user A is stored in the property database 132 is shown, but the property database 132 according to the embodiment of the present invention is not limited thereto, and the property data of a plurality of users may be stored.

[Example of Article Image Database 134]

FIG. 12 is an explanatory view showing one example of the article image database 134 according to the embodiment of the present invention. As shown in FIG. 12, the article image database 134 is stored with "article ID" identifying each article, "article name" indicating the name of each article, and "image data" indicating each article in image. Each row shown in FIG. 12 corresponds to the article image data corresponding to one article.

Each component of the information processing device 100 will be described with reference again to FIG. 8. The communication unit 104 communicates with the purchase history storage device 200, and the display devices 300, 400, . . . through the network 500. More specifically, the communication unit 104 transmits the acquisition request of the purchase history data to the purchase history storage device 200, and receives the purchase history data transmitted from the purchase history storage device 200. Furthermore, the communication unit 104 receives the display request transmitted from each display device, and transmits the display data corresponding to the display request to the display device of the transmission source.

The purchase history data acquiring unit 106 generates the acquisition request of the purchase history data to the purchase history storage device 200 on a regular/irregular basis, and transmits the acquisition request of the purchase history data to the communication unit 104. The purchase history data acquiring unit 106 receives the purchase history data received by the communication unit 104 from the communication unit 104.

The property data recording unit 108 generates the property data based on the purchase history data acquired by the purchase history data acquiring unit 106, and records the generated property data in the property database 132 of the storage unit 102. That is, the property data recording unit 108 plays a role of performing the process of "(2) generate property data" described above in the information processing device 100.

The article image acquiring unit 110 is connected to an external device through the network 500 on a regular/irregular basis, and acquires the article identification information such as JAN code of the article, the article image of the article, and the like. The article image acquiring unit 110 records the acquired information in the article image database 134 stored in the storage unit 102 as the article image data. The external device to which the article image acquiring unit 110 is connected includes a server of a company of the distribution source of the article, a server of a company collectively managing the JAN code, and the like but is not limited thereto.

The article image acquiring unit 110 is not limited to being connected to the external device on a regular/irregular basis. For instance, if the article image corresponding to the article indicated by the purchase history data is not recorded in the article image database 134, the article image acquiring unit 110 is connected to the external device when the property data recording unit 108 generates the property data, and records the article image data in the article image database 134.

The property data updating unit 112 generates the second property image based on the purchased time information of the property data and the time information defining the current time with respect to each property data stored in the property database 132, and updates the property data. That is, the property data recording unit 108 plays a role of performing the process of "(3) Update property data" in the information processing device 100.

The property data updating unit 112 calculates the elapsed time from the purchase of the property based on the purchased time information of the property data and the time information defining the current time, and generates the second property image corresponding to the calculated elapsed time using the calculated elapsed time and a look up table in which the elapsed time and the parameter for generating the second property image (e.g., parameter defining change of the property image as shown in FIGS. 2A to 2G) are corresponded, but is not limited thereto. The look up table used to generate the second property image is stored in the storage unit 102, and appropriately read out by the property data updating unit 112. The information on the threshold value for determining the time lapse may be held in the storage means arranged in the property data updating unit 112. The storage means arranged in the property data updating unit 112 includes a nonvolatile memory such as EEPROM and flash memory.

The property data updating unit 112 can update the property data by recording a plurality of property data in the property database 132 (addition of record) with respect to one article, as shown in the property "article Y" of FIG. 11, but is not limited thereto. The image data "y01.jpg" showing the property "article Y" of FIG. 11 corresponds to the first property image, and the "y02.jpg" corresponds to the second property image.

The display data generating unit 114 includes a display target determining unit 116 and a data generating unit 118, generates the display data according to the display request transmitted from the display device and the like, and transmits the generated display data to the device of the transmission source of the display request. That is, the property data recording unit 108 plays a role of performing the process of "(4) generate display data" and the process of "(5) transmit/display display data" in the information processing device 100.

The display target determining unit 116 determines the user for generating the display data based on the display request received by the communication unit 104. The display target determining unit 116 can determine the user for generating the display data by the information on the user ID which display of the information on the property is desired in the display request.

The display target determining unit 116 can also determine the group to which the device (e.g., display device) of the transmission source of the display request belongs based on the display request. The display target determining unit 116 can determine the group to which the device of the transmission source of the display request belongs by the device identification information for identifying the device of the display request such as the MAC address.

More specifically, the display target determining unit 116 determines the group to which the device of the transmission source of the display request belongs based on the information on the MAC address of the display request, and a group database (not shown) in which the MAC address (one example of device identification information) and the group are recorded in correspondence to each other. Furthermore, the display target determining unit 116 determines that the device of the transmission source of the display request belongs to a predefined group when the information on the MAC address of the display request is not registered in the group database (not shown). Therefore, the display target determining unit 116 can uniquely determine the group to which the device of the transmission source of the display request belongs. It is to be noted that the method of determining the group according to the embodiment of the present invention is not limited to the above.

The data generating unit 118 generates the display data based on the user determined by the display target determining unit 116, the user image data corresponding to the relevant user, and the property data corresponding to the relevant user. More specifically, the data generating unit 118 searches the user image database 130 shown in FIG. 10 based on the user determined by the display target determining unit 116 and extracts a user image (correspond to "image data" of FIG. 10), or searches the property database 132 shown in FIG. 11 and extracts a property image (correspond to "image data" of FIG. 11) to generate the display data.

The data generating unit 118 assumes the property image recently generated with the time of generation of the display data as the reference as the image of the property configuring the display data when a plurality of property images exist with respect to one property in the property database 132. Therefore, the data generating unit 118 can represent the property of the user by image, as shown in "[1] first example" and FIG. 2.

The data generating unit 118 assumes the property image of the property corresponding to the article which purchased time is recent with the time of generation of the display data (or each time point when representing the history) as the reference as the image of the property configuring the display data when the property belonging to the same type of category (e.g., discriminated by JAN code, not shown in FIG. 11) exists in the property database 132. Therefore, the data generating unit 118 can represent the property of the user by image, as shown in "[4] fourth example" and FIG. 5.

Furthermore, the data generating unit 118 acquires the information on the payment method and the information on the obtaining method based on the information recorded in the "obtaining method" of the property database 132 to represent the property of the user by image, as shown in "[2] second example" and FIG. 3, or "[3] third example" and FIG. 4.

The data generating unit 118 can also generate the display data based on the group determined by the display target determining unit 116 and the group information, in addition to the user determined by the display target determining unit 116, the user image data corresponding to the user, and the property data corresponding to the user.

More specifically, the data generating unit 118 acquires the first group information (e.g., correspond to "group A display decision", "group B display decision" of FIG. 11) and the second group information (e.g., correspond to "group A display method", "group B display method" of FIG. 11) from the property database 132 based on the group determined by the display target determining unit 116. The data generating unit 118 generates the display data in which the image of the property is selectively displayed based on the acquired first group information (e.g., "display", "not display" shown in FIG. 11), and generates the display data in which the simplified image or the detailed image is selectively displayed based on the acquired second group information (e.g., "schematic layer", "detailed layer" shown in FIG. 11). Therefore, the data generating unit 118 can represent the property of the user by image as shown in "[5] fifth example" and FIGS. 6 and 7.

The data generating unit 118 transmits the generated display data to the communication unit 104. The communication unit 104 can transmit the display data generated by the data generating unit 118 to the device of the transmission source of the display request based on the device identification information such as the MAC address and the IP address of the display request, but is not limited thereto.

The display data generating unit 114 can generate the display data in which the image as shown in [1] to [5] and FIGS. 2 to 7 can be displayed, and transmit the generated display data to the device of the transmission source of the display request by arranging the display target determining unit 116 and the data generating unit 118.

The operation unit 120 is an operation means of the information processing device 100 enabling the predetermined operation by the user. With the arrangement of the operation unit 120 in the information processing device 100, the user can perform registration, updating, and deletion operation of the record to the user image database 130, and registration, updating, and deletion operation of the record to the group database (not shown) to carry out the operation desired by the user on the information processing device 100. The operation unit 120 includes the operation input device such as keyboard and mouse, the button, the direction key, the rotary selector such as jog dial, or the combination thereof, but is not limited thereto. The operation unit 120 may be integrated with the display unit 122 as in a touch screen.

The display unit 122 is a display means arranged in the information processing device 100, and displays the display data generated by the display data generating unit 114, and various screens such as the operation screen for the operation of the operation unit 120 displayed by the control unit (not shown). The display unit 122 includes LCD, organic EL display, and the like, but is not limited thereto.

The information processing device 100 can carry out the processes of (1) acquire purchase history data of user, (2) generate property data, (3) update property data, (4) generate display data, and (5) transmit/display display data by including the storage unit 102, the communication unit 104, the purchase history data acquiring unit 106, the property data recording unit 108, the article image acquiring unit 110, the property data updating unit 112, the display data generating unit 114, the operation unit 120, and the display unit 122. Therefore, the information processing device 100 can generate the display data corresponding to the display request transmitted from the display device serving as the external device, and cause the display device to display the generated display data.

The information processing device 100 selects the image of the property configuring the display data with the time of generation of the display data as the reference, and thus can represent the information on the property based on the purchase behavior of the user by image by clearly distinguishing the property purchased a few years ago and the property purchased a few days ago. Therefore, the information processing device 100 enables the information on the property based on the purchase behavior of the user to be shared among unspecified number of people while maintaining the privacy of the user.

Therefore, the property information providing system 1000 according to the embodiment of the present invention includes the purchase history storage device 200, the display devices 300, 400, . . . , and the information processing device 100. The purchase history storage device 200 stores the purchase history database 210, and transmits the purchase history data to the information processing device 100 based on the acquisition request of the purchase history data from the information processing device 100. Each display device 300, 400, . . . transmits the display request to the information processing device 100, receives the display data transmitted from the information processing device 100 in response to the display request, and displays the image indicated by the display data.

The information processing device 100 performs the processes of (1) acquire purchase history data of user, (2) generate property data, (3) update property data, (4) generate display data, and (5) transmit/display display data to generate the display data corresponding to the display request transmitted from each display device, and cause the display device to display the generated display data.

The information processing device 100 selects the image of the property configuring the display data with the time of generation of the display data as the reference, and generates the display data. Thus, the information processing device 100 can generate the display data in which the information on the property based on the purchase behavior of the user is represented by image after clearly distinguishing the property purchased a few years ago and the property purchased a few days ago, and cause the device of the transmission source of the display request to display the image indicated by the display data. Therefore, the information processing device 100 enables the information on the property based on the purchase behavior of the user to be shared among unspecified number of people while maintaining the privacy of the user.

The information processing device 100 can also selectively represent the image of the property configuring the display data using group information. Therefore, the information processing device 100 not only provides the information on the property of the user to unspecified number of people by image, but also selectively provides the information on the property of the user, and thus enables the information on the property based on the purchase behavior of the user to be shared among unspecified number of people while more strongly protecting the privacy of the user.

Therefore, in the property information providing system 1000 according to the embodiment of the present invention, the information on the property based on the purchase behavior of the user can be shared among unspecified number of people while maintaining the privacy of the user.

[Variant of Property Information Providing System 1000 According to the Embodiment of the Present Invention]

In the above description, a configuration in which the information processing device 100 acquires the purchase history data from the purchase history storage device 200 is shown as the property information providing system 1000 according to the embodiment of the present invention. However, the embodiment of the present invention is not limited to such configuration, and the information processing device and the purchase history storage device may be configured to function as an integrated device.

In such case, the information processing device according to the variant stores the purchase history database in the storage unit, and acquires the purchase history data from the purchase history database stored in the storage unit. In the above configuration, the information processing device according to the variant also performs the processes of (1) acquire purchase history data of user, (2) generate property data, (3) update property data, (4) generate display data, and (5) transmit/display display data, similar to the information processing device 100. Therefore, the information processing device according to the variant has effects similar to the information processing device 100.

[Application Example of Property Information Providing System According to the Embodiment of the Present Invention]

The property information providing system according to the embodiment of the present invention may be applied to information sharing when a third person (third person is mainly a person other than the user who provides the information on the property. The third person may be the user himself/herself who provides the information on the property) accesses the home page or the blog, but is not limited thereto. For instance, the property information providing system according to the embodiment of the present invention may be used in an on-line user community such as "Home", and applied to information sharing in the community.

The purchase history storage device 200 has been described as a component configuring the property information providing system according to the embodiment of the present invention, but the embodiment of the present invention is not limited to such mode, and may be applied to a computer such as PC (Personal Computer) and server.

The display devices 300, 400, . . . have been described as components configuring the property information providing system according to the embodiment of the present invention, but the embodiment of the present invention is not limited to such mode, and may be applied to various display devices such as CRT (Cathode Ray Tube) display, organic EL display, and LCD, receiver device for receiving television broadcast, portable communication device such as portable telephone, computer such as PC, portable game machine such as PlayStation Portable (registered trademark), and the like.

The information processing device 100 has been described as a component configuring the property information providing system according to the embodiment of the present invention, but the embodiment of the present invention is not limited to such mode, and may be applied to a computer such as PC, UMPC (Ultra Mobile Personal Computer), and server, portable communication device such as portable telephone, portable game machine such as PlayStation Portable (registered trademark), game machine such as PlayStation (registered trademark) series, and the like.

(Program According to the Embodiment of the Present Invention)

The information on the property based on the purchase behavior of the user can be shared among unspecified number of people while maintaining the privacy of the user by a program for causing a computer to function as the information processing device 100 according to the embodiment of the present invention.

(Display Data Providing Method)

The information providing method according to the embodiment of the present invention will now be described. The information providing method according to the embodiment of the present invention will be described below in three parts (I) process of acquiring purchase history data and recording property data, (II) process of updating property data, and (III) process of generating and transmitting display data.

(I) Process of Acquiring Purchase History Data and Recording Property Data

Figure 13:
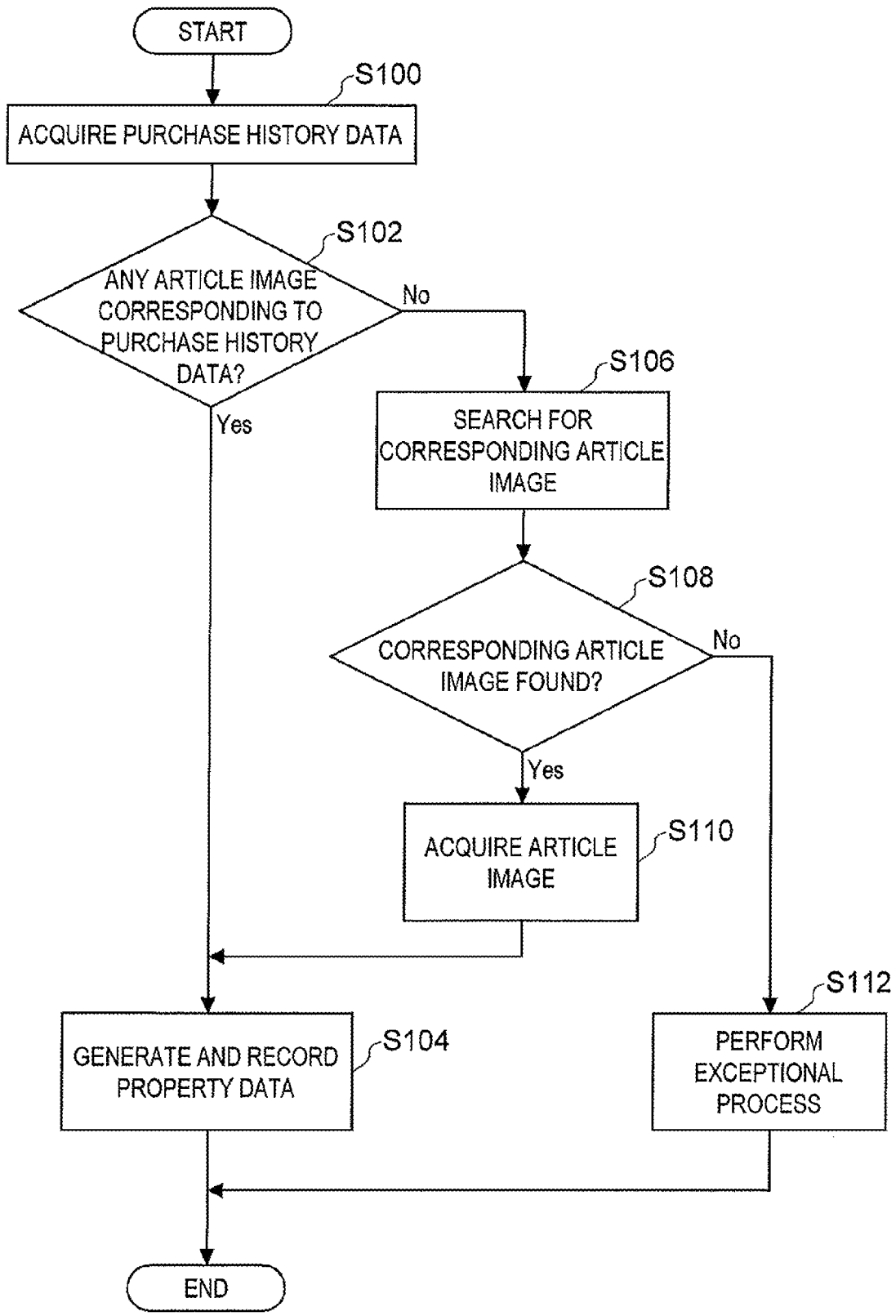
FIG. 13 is a first flowchart showing one example of an information providing method according to the embodiment of the present invention.

FIG. 13 is a first flowchart showing one example of the information providing method according to the embodiment of the present invention, and shows the process of acquiring the purchase history data and recording the property data. FIG. 13 corresponds to each process of (1) acquire purchase history data of user and (2) generate property data in the information processing device 100.

The information processing device 100 acquires the purchase history data from the purchase history storage device 200 (S100). The information processing device 100 may carry out the process of step S100 on a regular or an irregular basis.

The information processing device 100 determines whether or not an article image corresponding to the purchase history data acquired in step S100 is present (S 102). The information processing device 100 may carry out the determination of step S102 by searching the article image database 134 stored in the storage unit 102 based on the article identification information such as the JAN code included in the purchase history data.

If determined that the article image corresponding to the acquired purchase history data is present in step S102, the information processing device 100 generates the property data, and records the generated property data in the property database 132 of the storage unit 102 (S104).

If determined that the article image corresponding to the acquired purchase history data is not present in step S102, the information processing device 100 connects to the external device through the network 500, and searches for the article image corresponding to the acquired purchase history data, similar to step S102 (S106). The information processing device 100 determines whether or not the article image corresponding to the purchase history data acquired in step S100 is present (S108).

If determined that the article image corresponding to the acquired purchase history data is present in step S108, the information processing device 100 acquires the article image from the external device (S110). The information processing device 100 generates the property data, and records the generated property data in the property database 132 of the storage unit 102 (S104).

If determined that the article image corresponding to the acquired purchase history data is not present in step S108, the information processing device 100 performs an exceptional process (S112). The exceptional process in step S112 includes displaying a warning that the article image corresponding to the acquired purchase history data is not present on the display unit 122, but is not limited thereto. For instance, the information processing device 100 can generate the property data by having an exceptional image prepared in advance as the article image, and recording the same in the property database 132 as the exceptional process.

The information processing device 100 can carry out each process of (1) acquire purchase history data of the user and (2) generate property data by using the method shown in FIG. 13.

(II) Process of Updating Property Data

Figure 14:
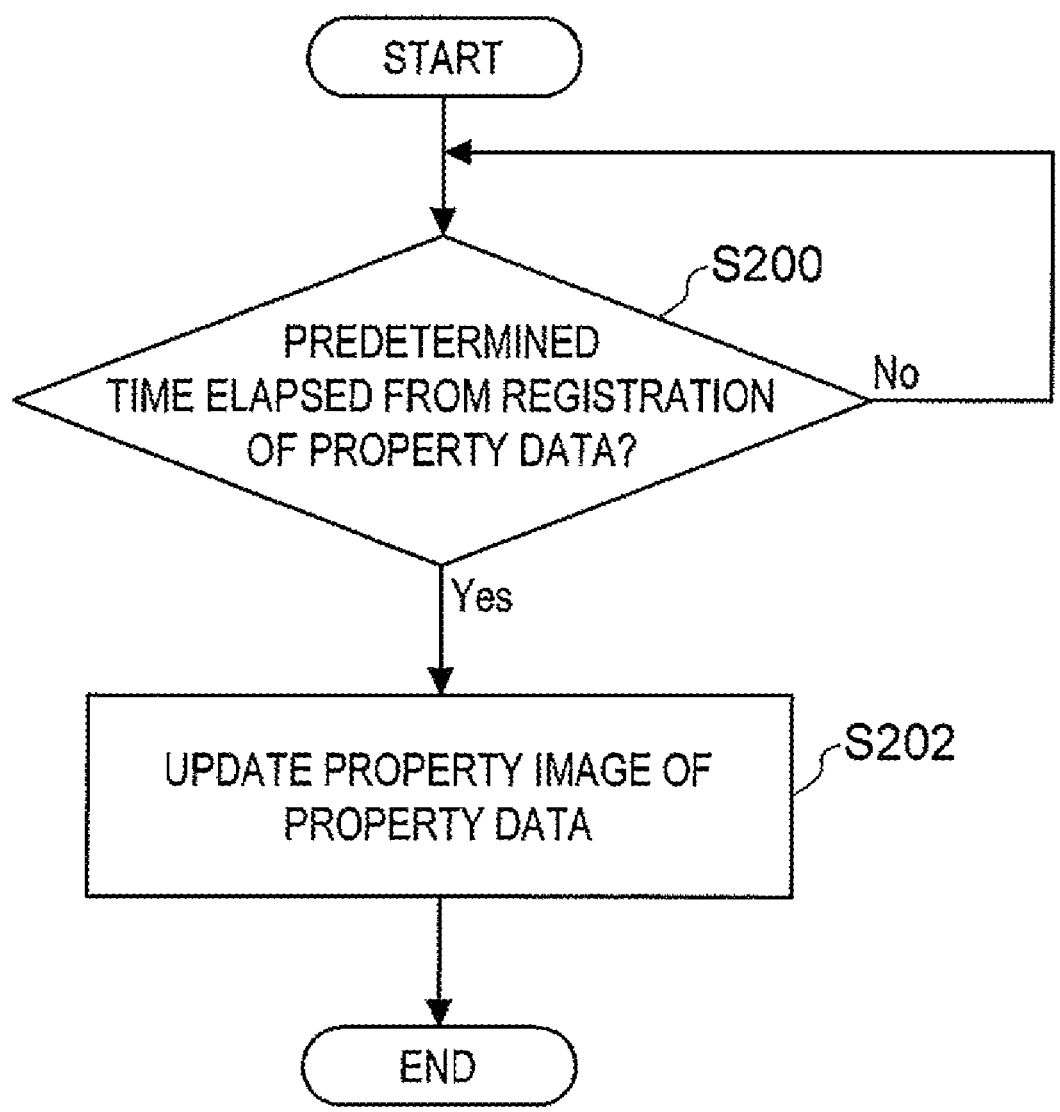
FIG. 14 is a second flowchart showing one example of the information providing method according to the embodiment of the present invention.

FIG. 14 is a second flowchart showing one example of the information providing method according to the embodiment of the present invention, and shows the process of updating the property data. FIG. 14 corresponds to the process of (3) update property data described above in the information processing device 100. FIG. 14 shows the process on one property, and the information processing device 100 can carry out the process for every property.

The information processing device 100 determines whether or not a predetermined time has elapsed from the registration (recording) of the property data (S200). The information processing device 100 can calculate the elapsed time from the purchase of the property based on the purchased time information of the property data and the time information defining the current time, and use the calculated elapsed time and the look up table in which the elapsed time and the parameter for generating the second property image are corresponded to determine the elapse of the predetermined time by the parameter, but is not limited thereto.

For instance, the information processing device 100 can also determine whether or not the predetermined time has elapsed by a threshold value process using the calculated elapsed time. When carrying out the determination of step S200 by the threshold value process, the information processing device 100 determines whether or not the predetermined time has elapsed based on the time at which the second property image is recorded and the time information defining the current time if the second property image is already generated with respect to one property. The information on the threshold value for determining the time lapse is stored in the storage unit 102, and appropriately read out by the property data updating unit 112. The information on the threshold value for determining the time lapse may be held in the storage means arranged in the property data updating unit 112. The storage means arranged in the property data updating unit 112 may be a nonvolatile memory such as EEPROM and flash memory, but is not limited thereto.

If determined that the predetermined time has not elapsed from the registration of the property data in step S200, the information processing device 100 does not proceed the process.

If determined that the predetermined time has elapsed from the registration of the property data in step S200, the information processing device 100 generates the second property image and updates the property data (S202).

The information processing device 100 can carry out the process of (3) update property data described above by using the method shown in FIG. 14.

(III) Process of Generating and Transmitting Display Data

Figure 15:
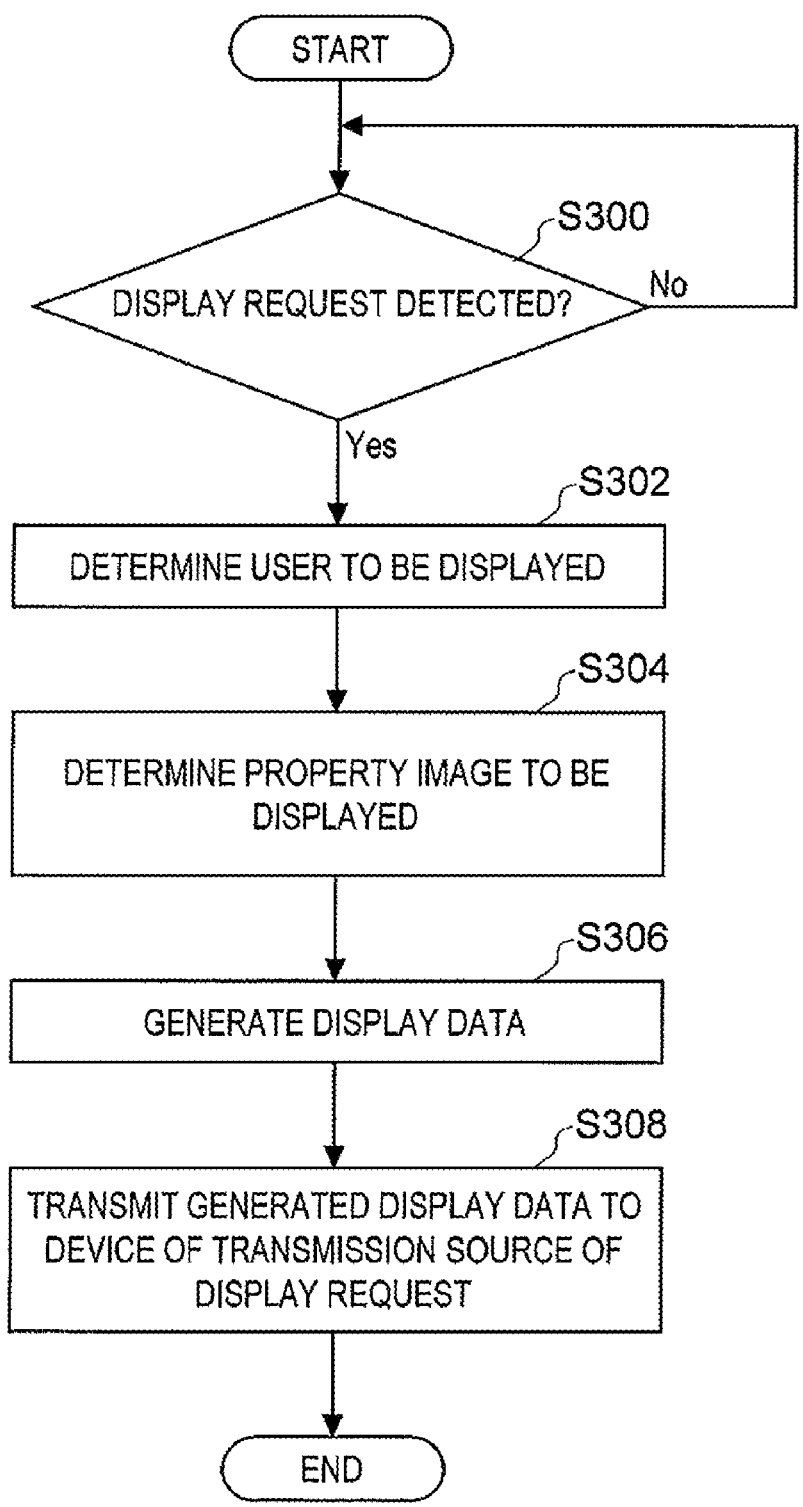
FIG. 15 is a third flowchart showing one example of the information providing method according to the embodiment of the present invention.

FIG. 15 is a third flowchart showing one example of the information providing method according to the embodiment of the present invention, and shows the process of generating and transmitting the display data. FIG. 15 corresponds to each process of (4) generate display data and (5) transmit/display display data described above in the information processing device 100.

The information processing device 100 determines whether or not the display request is detected (communication unit 104 received the display request) (S300). If determined that the display request is not detected in step S300, the information processing device 100 does not proceed the process.

If determined that the display request is detected in step S300, the information processing device 100 determines the user to be displayed (to generate the display data) (S302). The information processing device 100 can determine the user for generating the display data by the information on the user ID included in the display request, but is not limited thereto.

If the user to be displayed is determined in step S302, the information processing device 100 determines the property image to be displayed corresponding to the user based on the determined user (S304). The information processing device 100 specifies the property image to be displayed corresponding to the determined user by searching the property database 132 shown in FIG. 11 and extracting the property image (correspond to "image data" of FIG. 11) based on the user determined in step S302.

The information processing device 100 generates the display data based on the user determined in step S302 and the property image determined in step S304 (S306). The information processing device 100 can generate the display data using the user image (correspond to "image data" of FIG. 10) extracted by searching the user image database 130 shown in FIG. 10 based on the user determined in step S302, and the property image extracted in step S304.

The information processing device 100 can generate the display data representing the property image as shown in FIGS. 3, 4, 6, and 7 by using the information on the payment method, the information on the obtaining method, the group information, and the like.

When the display data is generated in step S306, the information processing device 100 transmits the generated display data to the device of the transmission source of the display request, and causes the device to display the image indicated by the display data (S308). The information processing device 100 can transmit the display data to the device of the transmission source of the display request by specifying the device of the transmission source of the display request based on the device identification information such as MAC address and IP address contained in the display request, but is not limited thereto.

The information processing device 100 can carry out each process of (4) generate display data and (5) transmit/display display data described above by using the method shown in FIG. 15.

The information processing device 100 can carry out the processes of (1) acquire purchase history data of user, (2) generate property data, (3) update property data, (4) generate display data, and (5) transmit/display display data by using the methods shown in FIGS. 13 to 15. Therefore, the information processing device 100 using the display data providing method as shown in FIGS. 13 to 15 can enable the information on the property based on the purchase behavior of the user to be shared among unspecified number of people while maintaining the privacy of the user.

It should be understood by those skilled in the art that various modifications, combinations, sub-combinations and alterations may occur depending on design requirements and other factors insofar as they are within the scope of the appended claims or the equivalents thereof.

In the property information providing system 1000 shown in FIG. 8, a configuration in which the information processing device 100 and each display device 300, 400, . . . communicate by way of the network 500 has been shown, but is not limited to such mode. For example, the information processing device according to the embodiment of the present invention and each display device may directly communicate using infrared data communication, IEEE 802.11 and the like. Even in such configuration, the information processing device according to the embodiment of the present invention can generate the display data according to the display request transmitted from the display device, and cause the display device to display the image indicated by the display data. Therefore, even in the above configuration, the information processing device according to the embodiment of the present invention enables the information on the property based on the purchase behavior of the user to be shared among unspecified number of people while maintaining the privacy of the user.

What is claimed is:

1. A display data providing method used in an information processing device including a communication unit for communicating with a purchase history storage device for storing, for a user of a plurality of users, purchase history data including article identification information for identifying an article purchased by the user and purchased time information indicating a time the article is purchased, a display device for displaying an image, and a storage unit for storing user image data in which user identification information for identifying the user and a user image representing the user are recorded in correspondence to each other, the method comprising the steps of:
    acquiring the purchase history data from the purchase history storage device;
    generating property data in which a first property image representing a property owned by the user through purchase and the purchased time information are recorded in correspondence to each other based on the purchase history data acquired in the acquiring step, and recording the generated property data in the storage unit, wherein the first property image comprises a representation of the article;
    updating the property data stored in the storage unit to provide updated property data including a second property image generated by modifying the representation of the article in the first property image so that the second property image visually represents a time interval elapsed from a time when the user purchased the article until a current time, based on the purchased time information of the property data stored in the storage unit and time information defining the current time;
    generating, in response to a display request received from the display device, display data comprising the user image representing the user and at least one image of the property owned by the user, based on the user image data and the property data, wherein the at least one image comprises the second property image; and
    transmitting the display data generated in the generating step to the display device transmitting the display request.

2. The display data providing method according to claim 1, wherein modifying the representation of the article in the first property image comprises modifying the representation of the article based on a payment method used to purchase the article.

3. At least one computer-readable storage device storing with computer-executable instructions that, when executed by at least one processor, perform a method used in an information processing device that comprises a communication unit for communicating with a purchase history storage device for storing, for a user of a plurality of users, purchase history data including article identification information identifying an article purchased by the user and purchased time information indicating a time the article is purchased, and a display device for displaying an image, and a storage unit for storing user image data in which user identification information for identifying the user and a user image representing the user are recorded in correspondence to each other, the method comprising:
    acquiring the purchase history data from the purchase history storage device;
    generating property data in which a first property image representing a property owned by the user through purchase and the purchased time information are recorded in correspondence to each other based on the purchase history data acquired in the acquiring step, and recording the generated property data in the storage unit, wherein the first property image comprises a representation of the article;

updating the property data stored in the storage unit to provide updated property data including a second property image generated by modifying the representation of the article in the first property image so that the second property image visually represents a time interval elapsed from a time when the user purchased the article until a current time, based on the purchased time information of the property data stored in the storage unit and time information defining the current time;

generating, in response to a display request received from the display device, display data comprising the user image representing the user and at least one image of the property owned by the user, based on the user image data and the property data, wherein the at least one image comprises the second property image; and transmitting the display data generated in the generating step to the display device transmitting the display request.

4. An information processing device capable of communicating with a purchase history storage device for storing, for a user of a plurality of users, purchase history data including article identification information for identifying an article purchased by the user and purchased time information indicating a time the article is purchased, and a display device for displaying an image, the information processing device comprising:

a storage unit for storing user image data in which user identification information for identifying the user and a user image representing the user are recorded in correspondence to each other, and property data in which a first property image representing a property owned by the user through purchase and the purchased time information are recorded in correspondence to each other, wherein the first property image comprises a representation of the article;

a communication unit for communicating with the purchase history storage device and/or the display device;

a purchase history data acquiring unit for acquiring the purchase history data from the purchase history storage device;

a property data recording unit for generating the property data based on the purchase history data acquired by the purchase history data acquiring unit, and recording the generated property data in the storage unit;

a property data updating unit for updating the property data stored in the storage unit to provide updated property data including a second property image generated by modifying the representation of the article in the first property image so that the second property image visually represents a time interval elapsed from a time when the user purchased the article until a current time, based on the purchased time information of the property data stored in the storage unit and time information defining the current time; and a display data generating unit for generating, in response to a display request received from the display device, display data comprising the user image representing the user and at least one image of the property owned by the user, based on the user image data and the property data, wherein the at least one image comprises the second property image.

5. The information processing device according to claim 4, wherein the property data updating unit calculates an elapsed time from the purchase based on the purchased time information of the property data stored in the storage unit and the time information, and generates the second property image corresponding to the calculated elapsed time.

6. The information processing device according to claim 4, wherein
the storage unit further stores article data in which the article identification information and an article image showing the article are stored in correspondence to each other; and
the property data recording unit selects the corresponding article image from the article data based on the article identification information of the purchase history data, and generates the property data with the selected article image as the first property image.

7. The information processing device according to claim 6, wherein
the purchase history data acquiring unit acquires the purchase history data further including purchase source information indicating a purchase source from which the user purchased the article and/or information on a payment method of the user; and
the property data recording unit generates the first property image based on the purchase source information and/or the information on the payment method of the purchase history data.

8. The information processing device according to claim 4, wherein the display data generating unit includes:
a display target determining unit for specifying a user for generating the display data based on the display request; and
a data generating unit for generating the display data based on the user specified by the display target determining unit, the user image data, and the property data.

9. The information processing device according to claim 8, wherein the data generating unit generates the display data having the second property image as the image of the property when a second property corresponding to the property is present in the property data.

10. The information processing device according to claim 8, wherein
the storage unit stores the property data further including first group information in which display/non-display for every property is defined for every group;
the display target determining unit further determines a group based on the display request; and
the data generating unit generates the display data in which the image of the property is selectively displayed based on a determination result of the group of the display target determining unit and the first group information of the property data.

11. The information processing device according to claim 8, wherein
the storage unit stores the property data further including second group information in which a display method defined with a detailed display or a simplified display for every property is set for every group;
the display target determining unit further determines a group based on the display request; and
the data generating unit generates the display data in which an image of the property displayed in detail or an image of the property displayed in a simplified manner is selectively displayed based on a determination result of the group of the display target determining unit and the second group information of the property data.

12. The information processing device according to claim 4, wherein modifying the representation of the article in the first property image comprises modifying a size of the representation of the article.

13. The information processing device according to claim 12, wherein the size of the representation of the article decreases as the time interval increases.

14. The information processing device according to claim 4, wherein modifying the representation of the article in the first property image comprises incorporating into the first property image at least one additional object representing that the time interval has elapsed.

15. The information processing device according to claim 9, wherein:

the second property comprises at least one second article purchased by the user after the article is purchased; and modifying the representation of the article in the first property image comprises incorporating a representation of the at least one second article into the first property image.

* * * * *